(12) United States Patent
Hessler et al.

(10) Patent No.: US 11,323,985 B2
(45) Date of Patent: May 3, 2022

(54) METHODS AND APPARATUS RELATING TO CONTROL CHANNEL DECODING IN A WIRELESS COMMUNICATIONS NETWORK

(71) Applicant: Telefonaktiebolaget LM Ericsson (publ), Stockholm (SE)

(72) Inventors: Martin Hessler, Linköping (SE); Pål Frenger, Linköping (SE); Jonas Fröberg Olsson, Ljungsbro (SE); Simon Ljungvall, Jönköping (SE); Gustav Wikström, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 65 days.

(21) Appl. No.: 16/650,543

(22) PCT Filed: Sep. 29, 2017

(86) PCT No.: PCT/SE2017/050960
§ 371 (c)(1),
(2) Date: Mar. 25, 2020

(87) PCT Pub. No.: WO2019/066691
PCT Pub. Date: Apr. 4, 2019

(65) Prior Publication Data
US 2020/0280974 A1 Sep. 3, 2020

(51) Int. Cl.
*H04W 72/04* (2009.01)
*H04W 72/12* (2009.01)
*H04B 7/06* (2006.01)

(52) U.S. Cl.
CPC ...... *H04W 72/0406* (2013.01); *H04B 7/0669* (2013.01); *H04W 72/0446* (2013.01); *H04W 72/1278* (2013.01)

(58) Field of Classification Search
CPC ............ H04W 72/1278; H04B 7/0669; H04B 2201/70701
See application file for complete search history.

(56) References Cited

U.S. PATENT DOCUMENTS

| 2003/0095532 | A1* | 5/2003 | Kim | ............... H04L 1/0041 370/342 |
| 2015/0249984 | A1* | 9/2015 | Papasakellariou | .... H04L 1/1812 370/329 |

(Continued)

OTHER PUBLICATIONS

EPO Communication and Supplementary European Search Report dated Apr. 29, 2021 for Patent Application No. 17927059.0, consisting of 13-pages.

(Continued)

*Primary Examiner* — Raj Jain
(74) *Attorney, Agent, or Firm* — Christopher & Weisberg, P.A.

(57) ABSTRACT

The disclosure provides methods and apparatus which relate to control channel decoding in a wireless communications network. In one aspect, there is provided a method in a wireless device for a wireless communications network. The method includes receiving a first set of coded control symbols on a physical control channel in a first time slot, receiving a second set of coded control symbols on the physical control channel in a second time slot subsequent to the first time slot, and attempting to decode a control message based on the first set of coded control symbols and the second set of coded control symbols using one or more soft-combining techniques.

30 Claims, 13 Drawing Sheets

(56) References Cited

U.S. PATENT DOCUMENTS

| | | |
|---|---|---|
| 2016/0242150 A1 | 8/2016 | Kang et al. |
| 2016/0249331 A1 | 8/2016 | Park et al. |
| 2020/0280974 A1* | 9/2020 | Hessler .............. H04L 5/0053 |

OTHER PUBLICATIONS

3GPP TSG RAN WG1 NR Ad Hoc Meeting R1-1715413; Title: UE Procedure of PDCCH monitoring for URLLC; Agenda Item: 6.3.1.6; Source: Huawei, HiSilicon; Document for: Discussion and decision; Date and Location: Sep. 18-21, 2017, Nagoya, Japan, consisting of 5-pages.

3GPP TSG RAN WG1 Meeting NR #3 R1-1716778; Title: PDCCH reliability for URLLC; Agenda Item: 6.3.1.6; Sourc: Huawei, HiSilicon; Document for: Discussion and decision; Date and Location: Sep. 18-21, 2017, Nagoya, Japan, consisting of 9-pages.

3GPP TSG RAN WG1 Meeting NR #3 R1-1716309; Title: Ultra-reliability for NR PDCCH; Agenda Item: 6.3.1.6; Source: Intel Corporation; Document for: Discussion and Decision; Date and Location: Sep. 18-21, 2017, Nagoya, Japan, consisting of 6-pages.

International Search Report and Written Opinion dated Aug. 14, 2018 for International Application No. PCT/SE2017/050960 filed on Sep. 29, 2017, consisting of 14-pages.

3GPP TSG RAN NR AH3 R1-1716248; Title: Reliable PDCCH operation for NR; Agenda Item: 6.3.1.6; Source: Sony; Document for: Discussion / decision; Location and Date: Nagoya, Japan Sep. 18-21, 2017, consisting of 6-pages.

\* cited by examiner

METHODS AND APPARATUS RELATING TO CONTROL CHANNEL DECODING IN A WIRELESS COMMUNICATIONS NETWORK

CROSS-REFERENCE TO RELATED APPLICATIONS

This application is a Submission Under 35 U.S.C. § 371 for U.S. National Stage Patent Application of International Application Number: PCT/SE2017/050960, filed Sep. 29, 2017 entitled "METHODS AND APPARATUS RELATING TO CONTROL CHANNEL DECODING IN A WIRELESS COMMUNICATIONS NETWORK," the entirety of which is incorporated herein by reference.

TECHNICAL FIELD

The present disclosure relates to wireless communications, and particularly to methods and apparatus relating to control channel decoding in a wireless communication network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In an LTE wireless communication network, physical control channels are used to transmit downlink and uplink assignments/grants. The physical downlink control channel (PDCCH) was introduced in the very first release of LTE, while the evolved PDCCH (ePDCCH) was introduced later in Rel-11.

According to current standards, the size of the downlink control region, i.e. the resources where a PDCCH can be located, is adaptive in time domain, typically covering the initial one to three OFDM symbols in each subframe. The size used is signaled to the UEs using the PCFICH (Physical Control Format Indicator CHannel). In the frequency domain the PDCCH is static, covering the whole frequency band.

The ePDCCH is also static, but in the time domain, where the starting OFDM symbol of the ePDCCH is the one following directly after the downlink control region. In the frequency domain the ePDCCH is semi-static, where a UE can be configured with up to two ePDCCH regions (called sets). Each of the ePDCCH sets covers a set of physical resource blocks, not necessarily of equal size.

A search space is a set of time-frequency locations where a UE attempts to receive a PDCCH or a ePDCCH. There are common and UE-specific search spaces. All UEs will attempt to receive a PDCCH/ePDCCH in the common search spaces while only specific UEs will consider the UE-specific search spaces.

Upon a successful reception of a downlink assignment the UE may perform a reception of a data transmission on PDSCH (Physical Downlink Shared CHannel) according to the received assignment. The UE decodes the data and then transmits a HARQ-ACK (Hybrid Automatic Repeat request) indicating whether the data was successfully decoded or not. The HARQ-ACK may be sent on PUSCH (Physical Uplink Shared CHannel) or PUCCH (Physical Uplink Control CHannel) depending on if the UE additionally sends data or not. For FDD (Frequency Division Duplex) the HARQ-ACK is transmitted in sub-frame n+4 acknowledging a data transmission in sub-frame n. When the eNB receives the HARQ-ACK it may determine whether it needs to perform a re-transmission or not. There are 8 HARQ processes in the UEs which allows for a HARQ-RTT (HARQ Round-Trip Time) of 8 sub-frames. Depending on the processing capability of the eNB, the HARQ-RTT may be shortened slightly.

3GPP has started work on 5G new radio (NR) technology where reduced latency is one of the key features. For NR the PDCCH is expected to be in the first OFDM symbol(s) like the LTE PDCCH to allow for early decoding, although this may not necessarily be the case. The PUCCH is proposed to be in the last OFDM symbol of each slot which may make it possible to transmit the HARQ-ACK in the same sub-frame as the acknowledged data transmission.

Certain categories of traffic, e.g. ultra-reliable, low-latency communications (URLLC), put very strict robustness requirements on the control channel, as well as low-latency requirements. For example, the control channel may need to operate at error probabilities significantly lower than $10^{-5}$. One way of supporting such high requirements on robustness on the NR-PDCCH is to use a large number of physical resources for the DL control channel, e.g. to use 32 CCEs (control channel elements) for the NR-PDCCH. However, such a large number of CCEs requires that the control region is large enough to contain that many CCEs. The current assumption in 3GPP is that a CCE consists of 6 REGs (Resource Element Groups), where a REG maps to the REs (Resource Elements) in one OFDM symbol and PRB (Physical Resource Block). With a 30 kHz sub-carrier spacing (SCS) numerology, a 20 MHz bandwidth consists of 50 PRBs and hence the total number of CCEs is at most 8 if the control region consists of a single OFDM symbol. With a larger control region covering more OFDM symbols the number of CCEs can be increased, but this means less resources for the PDSCH. It will be noted that the numerology set out above may be different in the eventual release of NR, or in future releases. However, the problem remains, of achieving low error rates for the control channel without utilizing excessive resources at the expense of the shared data channel.

Hence there is a trade-off between control channel resource usage and reliability requirements that may make certain use cases very challenging (e.g. URLLC).

SUMMARY

There are, proposed herein, various embodiments which address one or more of the issues disclosed herein.

In one aspect, there is provided a method in a wireless device for a wireless communications network. The method comprises: receiving a first set of coded control symbols on a physical control channel in a first time slot; receiving a second set of coded control symbols on the physical control channel in a second time slot subsequent to the first time slot; and attempting to decode a control message based on the first set of coded control symbols and the second set of coded control symbols using one or more soft-combining techniques.

In further aspects of the disclosure, there is provided a communication system including a host computer. The host computer comprises: processing circuitry configured to provide user data; and a communication interface configured to forward user data to a cellular network for transmission to a user equipment (UE). The UE comprises a radio interface and processing circuitry, the UE's components configured to perform any of the steps of any of the embodiments described herein, including the method recited above.

In some embodiments, the cellular network further includes a base station configured to communicate with the UE.

In some embodiments, the processing circuitry of the host computer is configured to execute a host application, thereby providing the user data; and the UE's processing circuitry is configured to execute a client application associated with the host application.

A further aspect of the disclosure provides a method implemented in a communication system including a host computer, a base station and a user equipment (UE). The method comprises: at the host computer, providing user data; and, at the host computer, initiating a transmission carrying the user data to the UE via a cellular network comprising the base station. The UE performs any of the steps of any of the embodiments described herein, including the method recited above.

In some embodiments, the method further comprises, at the UE, receiving the user data from the base station.

In a further aspect, there is provided a wireless device configured to perform the method recited above. For example, in one aspect there is provided a wireless device for a wireless communications network. The wireless device comprises processing circuitry and a non-transitory machine-readable medium storing instructions which, when executed by the processing circuitry, cause the wireless device to: receive a first set of coded control symbols on a physical control channel in a first time slot; receive a second set of coded control symbols on the physical control channel in a second time slot subsequent to the first time slot; and, attempt to decode a control message based on the first set of coded control symbols and the second set of coded control symbols using one or more soft-combining techniques.

In another aspect of the disclosure, there is provided a method in a network node for a wireless communications network. The method comprises: determining that a wireless device operable in the wireless communications network is configured to soft-combine a physical control channel transmitted over multiple time slots; initiating transmission of a first set of coded control symbols in a physical control channel to the wireless device in a first time slot; and initiating transmission of a second set of coded control symbols in the physical control channel to the wireless device in a second time slot subsequent to the first time slot. The first set of coded control symbols comprises a control message, and the second set of coded control symbols comprises a duplicate copy of the control message.

In further aspects of the disclosure, there is disclosed a communication system including a host computer. The host computer comprises: processing circuitry configured to provide user data; and a communication interface configured to forward the user data to a cellular network for transmission to a user equipment (UE). The cellular network comprises a base station having a radio interface and processing circuitry, the base station's processing circuitry being configured to perform any of the steps of any of the embodiments described herein, including the method recited above.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data; and the UE comprises processing circuitry configured to execute a client application associated with the host application.

In further aspects of the disclosure, there is provided a method implemented in a communication system including a host computer, a base station and a user equipment (UE). The method comprises: at the host computer, providing user data; and, at the host computer, initiating a transmission carrying the user data to the UE via a cellular network comprising the base station. The base station performs any of the steps of any of the embodiments described herein, including the method recited above.

In some embodiments, the method further comprises, at the base station, transmitting the user data.

In some embodiments, the user data is provided at the host computer by executing a host application, and the method further comprises, at the UE, executing a client application associated with the host application.

In a further aspect, there is provided a network node configured to perform the method recited above. For example, in one aspect there is provided a network node for a wireless communications network. The network node comprises processing circuitry and a non-transitory machine-readable medium storing instructions which, when executed by the processing circuitry, cause the network node to: determine that a wireless device operable in the wireless communications network is configured to soft-combine a physical control channel transmitted over multiple time slots; initiate transmission of a first set of coded control symbols in a physical control channel to the wireless device in a first time slot; and initiate transmission of a second set of coded control symbols in the physical control channel to the wireless device in a second time slot subsequent to the first time slot. The first set of coded control symbols comprises a control message, and the second set of coded control symbols comprises a duplicate copy of the control message.

Certain embodiments may provide one or more of the following technical advantages. For example, some embodiments allow for soft-combination of control channel assignments providing high enough reliability for certain error-critical applications. By combining control channel assignments from different time slots this can be achieved without any need for multi-node coordination. However, by allowing for multiple transmission points to provide multiple control channel assignments for the wireless device to soft-combine, very high reliability can be achieved without increasing the decoding delay of the downlink control channel.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 7:
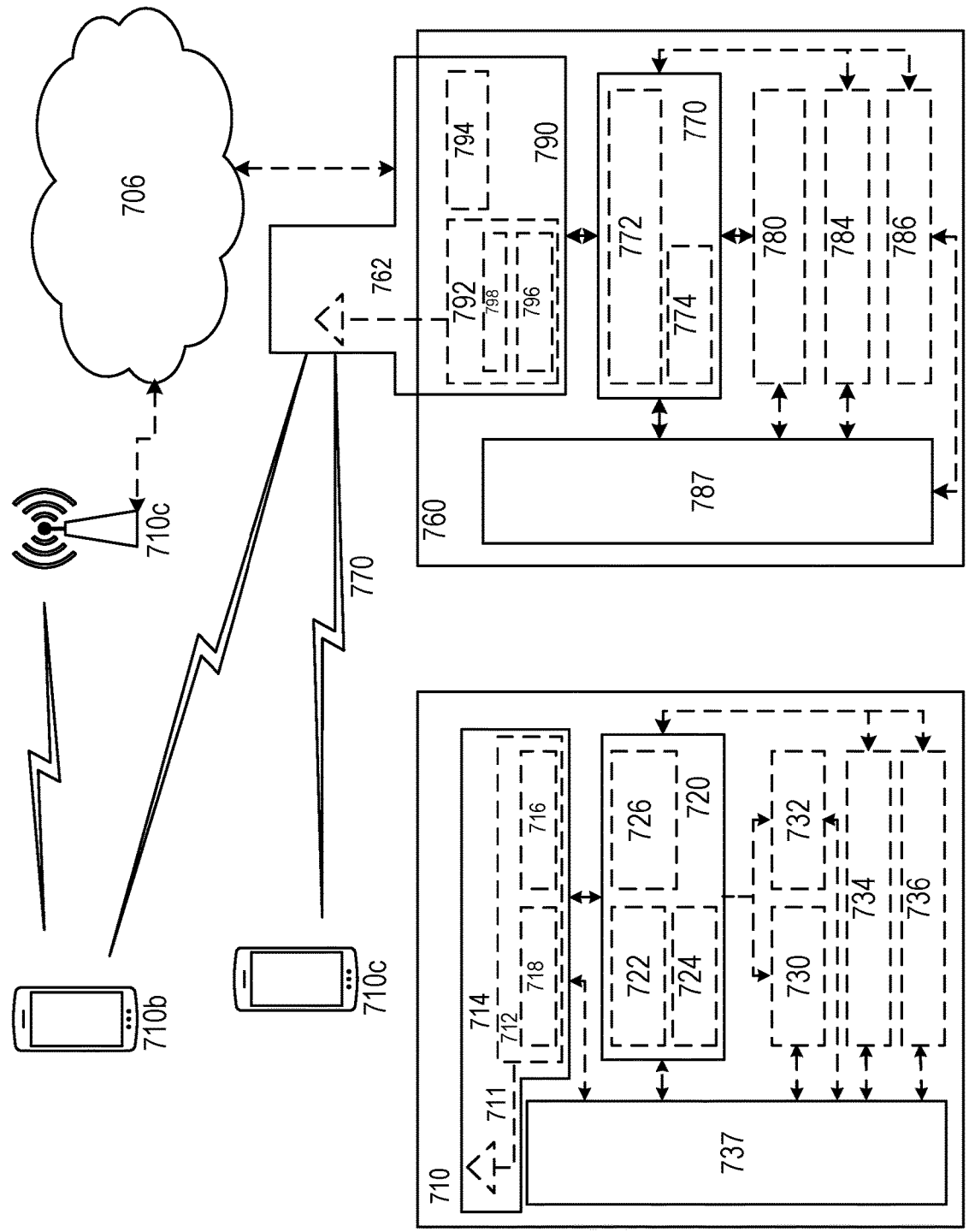
FIG. 7 shows a wireless network according to embodiments of the disclosure.

FIG. 7, discussed in more detail below, shows a wireless network according to embodiments of the disclosure. The network comprises one or more network nodes and one or more wireless devices (or UEs) which transmit to each other wirelessly. Transmissions from a wireless device to a network node are said to be transmitted in the uplink (UL), while transmissions from a network node to a wireless device are said to be transmitted in the downlink (DL).

The transmissions utilize radio resources which comprise time and frequency components. In the time domain, the transmissions are arranged into a plurality of repeated sub-frames, frames or slots (other nomenclature may be used, such as transmission time interval). In the frequency domain, the transmissions are arranged across a plurality of sub-channels at different frequencies.

Figure 1:
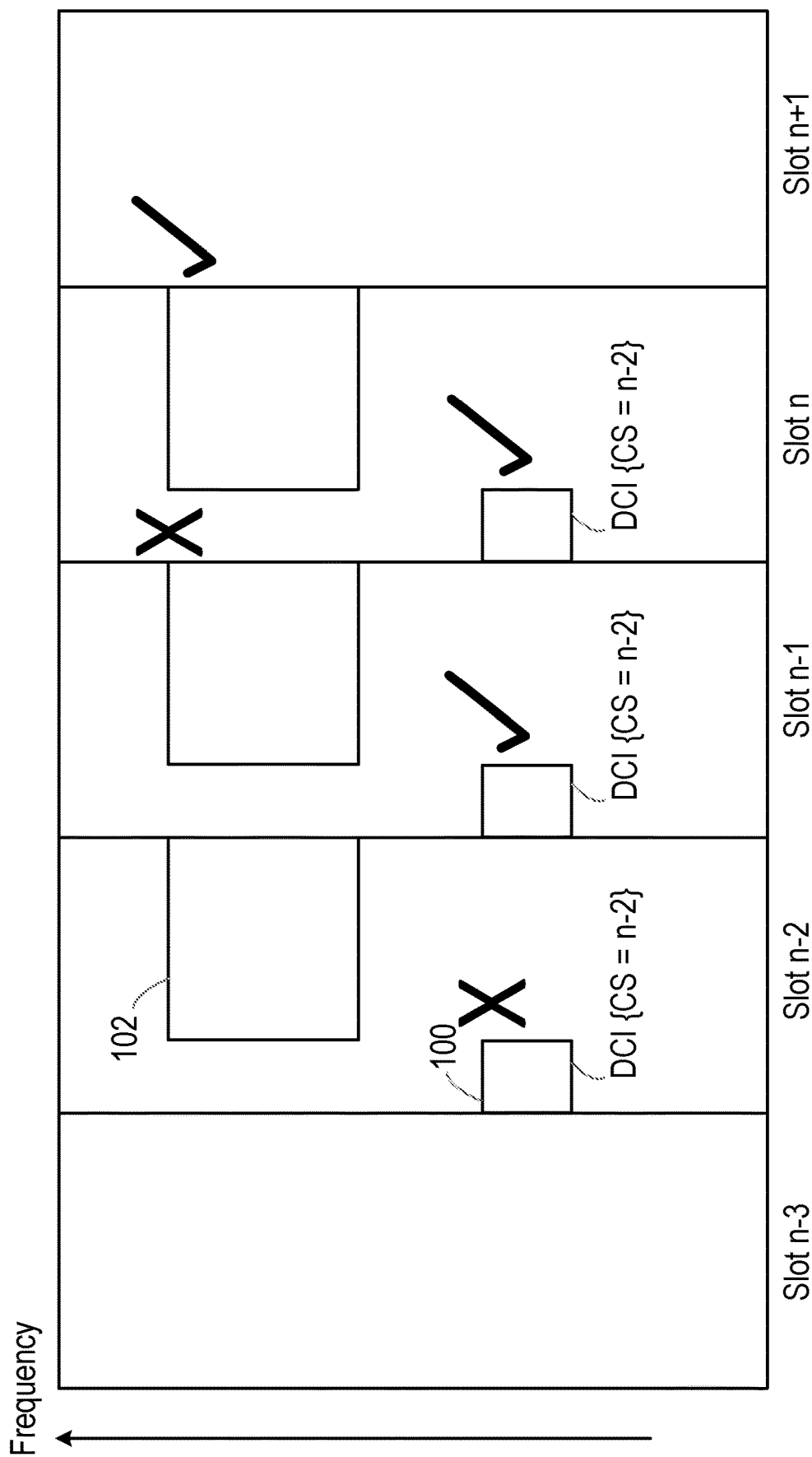
FIG. 1 is a schematic illustration of the transmission and decoding of control and data channels according to embodiments of the disclosure.

FIG. 1 is an illustration of the transmission of wireless signals in the downlink, i.e. from a network node to a wireless device, in a plurality of consecutive slots numbered from n−3 to n+1. Two physical channels are shown schematically in three of the slots, where transmissions take place from the network node to the wireless device: a physical control channel 100; and a physical data channel 102. The physical control channel may be the PDCCH or ePDCCH, for example, or any channel defined in future standards via which resources are allocated to the wireless device for the reception of the physical data channel 102. The physical data channel 102 may be a shared channel, such as the PDSCH or ePDSCH for example, or any other channel defined in future standards via which user data is transmitted to the wireless device.

In the illustration, the physical control channel 100 is illustrated in an initial part of each slot (e.g. one or more of the initial OFDM symbols within each slot). This is consistent with the existing LTE standard (where the PDCCH occupies the first 1-3 OFDM symbols), and also the presumptive solution for the forthcoming NR standard. However, it will be noted that the ePDCCH may be distributed in different OFDM symbols, and that physical control channels defined in future standards may also be distributed in any OFDM symbols of a slot. Thus the present disclosure is not limited in that respect, and the physical control channel 100 in general may be transmitted from the network node to the wireless device using any OFDM symbols in a particular slot. Similar considerations apply to the physical data channel 102, which is illustrated in FIG. 1 towards the latter part of each slot. The physical data channel 102 may be transmitted from the network node to the wireless device using any OFDM symbols in a particular slot.

Further, the channels 100, 102 are illustrated in FIG. 1 as being transmitted utilizing contiguous blocks of sub-channels or transmission frequencies. While this may be the case in some embodiments, in others the physical channels 100, 102 may be distributed over non-contiguous blocks of sub-channels or transmission frequencies.

According to embodiments of the disclosure, a wireless device operable in a wireless communication network may utilize one or more soft-combining techniques to decode control messages based on first and second sets of coded control symbols received in different time slots.

Thus, using the example of FIG. 1, the network node transmits wireless signals comprising physical control and physical data channels 100, 102 in each of consecutive slots n−2, n−1, and n. In slot n−2, the wireless device attempts to receive a first set of one or more coded control symbols in resources which are reserved for the transmission of the physical control channel 100, and to decode a control message which is transmitted using those coded control symbols. The control message may comprise an indication of resources on the physical data channel 102, which are allocated to the wireless device for the receipt of data (e.g. user data) from the network node. For example, the indication of resources may comprise a downlink control information (DCI) message, or other suitable format for indicating radio resources. The indication may further comprise a chain start indicator (CSI), as will be described in more detail below.

In this example, the attempt to decode the control message transmitted via the physical control channel in slot n−2 fails (indicated by a cross in FIG. 1). This may happen for any number of reasons, e.g., interference, poor channel quality, insufficient transmit power, etc. Thus the wireless device does not learn of the resources which are allocated to it for the reception of data over the physical data channel 102 in slot n−2. Coded data symbols in the physical data channel 102 are transmitted, but initially no attempt is made to decode them by the wireless device.

As noted above, according to embodiments of the disclosure the wireless device is configured to utilize one or more soft-combining techniques to decode control messages transmitted via the physical control channel. Thus in a subsequent slot n−1, the network node transmits a second set of coded control symbols over the physical control channel 100. The second set of control symbols comprises the same control message (i.e. a duplicate) as transmitted using the first set of control symbols in slot n−2. Thus the control data transmitted via the physical control channel 100 in slot n−2 is also transmitted via the physical control channel 100 in slot n−1.

Note that the wireless device may be configured to utilize soft-combining to decode certain control messages, but not others. Therefore certain control data may be transmitted by the network node in slot n−2 but not slot n−1, and vice versa. However, at least one control message transmitted by the network node in slot n−2 is repeated in slot n−1.

In slot n−1 the wireless device attempts to receive the second set of coded control symbols transmitted via the physical control channel 100, and attempts to decode the control message based on both the first and second sets of coded control symbols using one or more soft-combining techniques. As the soft-combining technique(s) combine data or energy from multiple time slots, it is more likely that the attempt to decode the control message is successful than any attempt based on the first and second sets of coded control symbols alone. In the illustrated example, the attempt to decode the control message using soft-combining in slot n−1 is successful (illustrated by the tick). Thus, the wireless device decodes the control message and determines the presence of resources allocated to it for the reception of data via the physical data channel 102.

According to embodiments of the disclosure, the wireless device may be further configured to utilize one or more soft-combining techniques to decode data transmitted in separate slots via the physical data channel 102. Thus duplicate copies of data may be transmitted to the wireless device by the network node in separate slots via the physical data channel 102. In one embodiment, the duplicate copies may be transmitted in a plurality of consecutive slots termed herein a "chain" of slots.

As noted above, in one embodiment the control message may comprise a chain start indicator (CSI), which indicates the initial slot in the chain of slots over which the duplicate copies of data are transmitted. For example, the CSI may be indicated with one or more bits in the DCI. If the chain comprises at most four transmissions (in one example), the DCI may comprise a two-bit field indicating the initial slot. In alternative embodiments, as discussed below, different mechanisms may be used to determine the initial slot of the chain.

In the illustrated embodiment, the CSI informs the wireless device that the initial transmission of data in the physical data channel took place in slot n−2. Thus, using one or more soft-combining techniques, the wireless device is able to utilize radio energy received in the indicated resources in slot n−2 as well as radio energy received in the indicated resources in slot n−1 to attempt to decode the data transmitted to it in the physical data channel. It will be recognized by those skilled in the art that the data from previous slots may be held in a buffer memory, for example, to enable post processing. Thus, although the physical data channel 102 received in slot n−2 is not initially decoded, a subsequent attempt to decode the data may be made based on the resources indicated in the control message (successfully decoded in slot n−1).

In the illustrated embodiment, the attempt to decode the user data in slot n−1 fails, despite the use of one or more soft-combining techniques and accumulated data or energy in slot n−2 and n−1 (illustrated by the cross).

In a subsequent slot n, the network node again transmits a physical control channel 100 and a physical data channel 102 comprising a duplicate control message and data. In this example, the wireless device successfully decodes the control message (e.g. based on soft-combining with the data or energy received in slots n−2 and n−1) transmitted via the physical control channel 100. The wireless device is then able to utilize soft-combining (e.g. with the data or energy received in slots n−2 and n−1) to successfully decode the data received via the physical data channel 102 in slot n.

Figure 2:
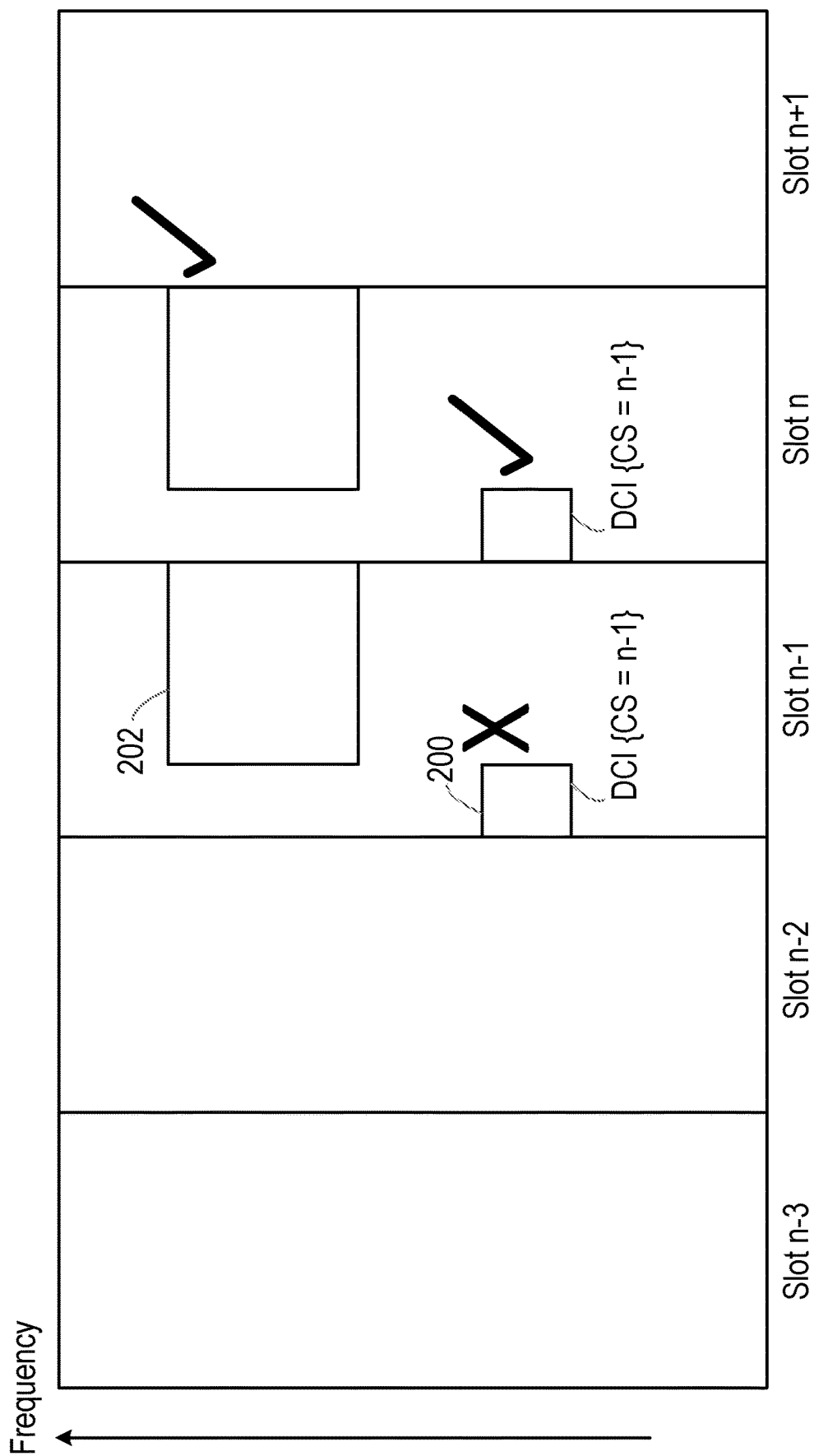
FIG. 2 is a schematic illustration of the transmission and decoding of control and data channels according to further embodiments of the disclosure.

FIG. 2 is a schematic illustration of signalling according to further embodiments of the disclosure. Again, the illustration shows the transmission of a physical control channel 200 and a physical data channel 202, which are similar to their respective counterparts in FIG. 1.

In the illustrated embodiment, the network node transmits to the wireless device in slots n−1 and n. In slot n−1, the network transmits to the wireless device a set of coded control symbols comprising a control message over the physical control channel 200. The control message comprises an indication of resources allocated to the wireless device for the receipt of data over the physical data channel 202. The control message may also comprise a CSI or other indication of the chain start.

In the illustrated example, the wireless device fails to decode the coded control symbols received in slot n−1, and thus initially does not attempt to decode the physical data channel 202 transmitted in slot n−1.

In a subsequent slot n, the wireless device is successful in decoding the control message received in a second set of coded control symbols. The wireless device may be configured to utilize soft-combining to decode the control message (i.e. based on the first and second sets of coded control symbols received in slots n−1 and n), or not (i.e. based on just the second set of coded control symbols). The wireless device is thus able to determine the resources allocated to it for the receipt of data over the physical data channel 202. Further, the wireless device is able to determine that the chain start was in slot n−1. Thus, the wireless device is able to use soft-combining to decode the user data transmitted in slots n−1 and n.

According to embodiments of the disclosure, the wireless device may be configured with a search space in which to search for the control channel. The search space may comprise a plurality of search space entries, each defining radio resources (e.g. transmission frequencies, physical resource blocks, etc) in which the physical control channel may be transmitted by the network node. A conventional search space configuration comprises search space entries for a single time slot. Thus, in each time slot, a conventional wireless device may blindly search the search space entries until the physical control channel is found.

Figure 3:
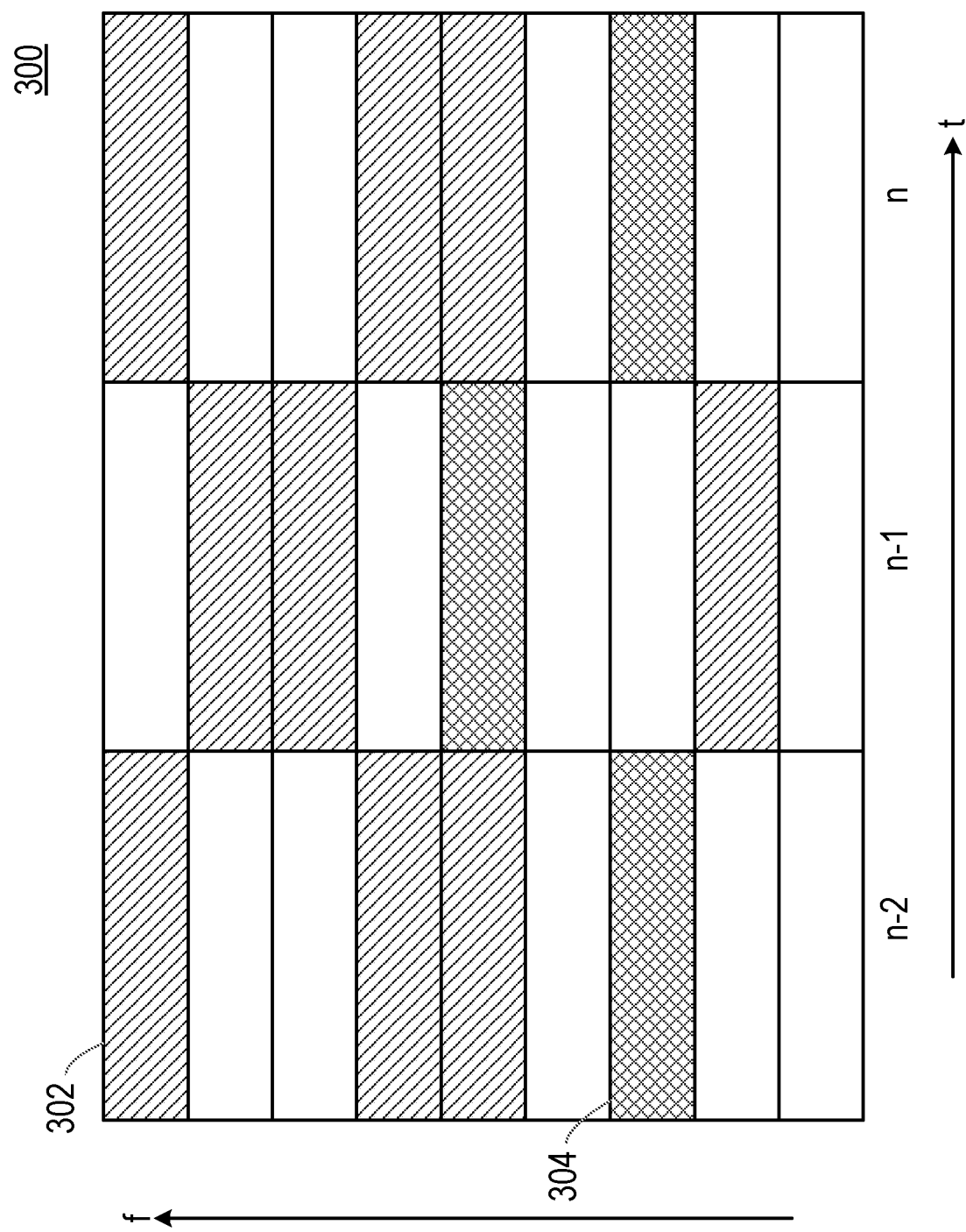
FIG. 3 is a schematic illustration of a search space configuration according to embodiments of the disclosure.

FIG. 3 is a schematic illustration of a search space configuration 300 according to embodiments of the disclosure, in which the search space configuration comprises at least one soft-combining search space entry 304 (illustrated by cross-hatching) defining transmission frequencies in multiple time slots for soft-combining. The search space configuration may additionally comprise one or more conventional search space entries 302 relating to a single time slot (illustrated by a diagonal fill).

Thus in each time slot the search space defines different transmission frequencies at which the physical control channel 100, 200 may be transmitted by the network node to the wireless device. The frequencies may be the same in each slot or, as in the illustrated embodiment, different.

Similarly, the soft-combining search space entry may define resources which are the same for each slot of the entry, or which are different in one or more slots. In one embodiment, the soft-combining search space entry may define a sequence of different resources in each of the consecutive time slots to which the entry relates. Thus the wireless device may be able to determine how to soft-combine transmissions based on detection of a transmission in resources in a single time slot. Consider the predefined sequence ABCD, where A, B C and D define different resources in consecutive time slots. Detection of a transmission in resources C in a slot n implies that soft-combining can be performed on resource A in slot n−2, resource B in slot n−1, and resource D in slot n+1.

In the illustrated embodiment, the search space configuration comprises three conventional search space entries 302 in each slot, and an additional search space entry 304 for soft-combining. The wireless device thus performs decoding attempts to find a valid control message for each of the three conventional search space entries 302, but also one or more decoding attempts to find a valid control message on the soft-combining search space entry 304 (i.e. using the energy or data in soft-combining search space entries 304 from previous slots).

The soft-combining search space may be semi-statically activated or configured for the wireless device, or activated depending on the traffic mode. Thus the wireless device may be configured to utilize soft-combining only for certain types of traffic, i.e., only when the network node has a certain type of traffic to transmit to the wireless device via the physical data channel. For example, soft-combining search space entries in the search space configuration may be configured or activated only for certain traffic types. In one example, the wireless device may be configured to utilize soft-combining for URLLC communications, or other traffic types or logical channels associated with particularly high quality of service (QoS) requirements. A further example may relate to the transmission of system information broadcast (SIB) messages, particularly device-specific SIB messages. The network node may configure the wireless device based on its own knowledge of the data which is to be transmitted (e.g. through signalling such as RRC signalling), or the wireless device may be aware of the traffic type and autonomously utilize soft-combining (or activate the soft-combining search space entries).

The wireless device may search for a control message in a soft-combining search space entry 304 only if it fails to decode a valid control message on any of the search space entries 302 relating to a single time slot.

The conventional search space entries 302 may overlap with the soft-combining search space entries 304, or be defined on different resources. If overlapping (i.e. if a conventional search space entry 302 comprises at least some of the same transmission frequencies or physical resource blocks as a soft-combining search space entry 304), the wireless device may thus attempt to decode a control message on those resources based on a single time slot and also based on multiple time slots (i.e. using soft-combining).

Figure 4:
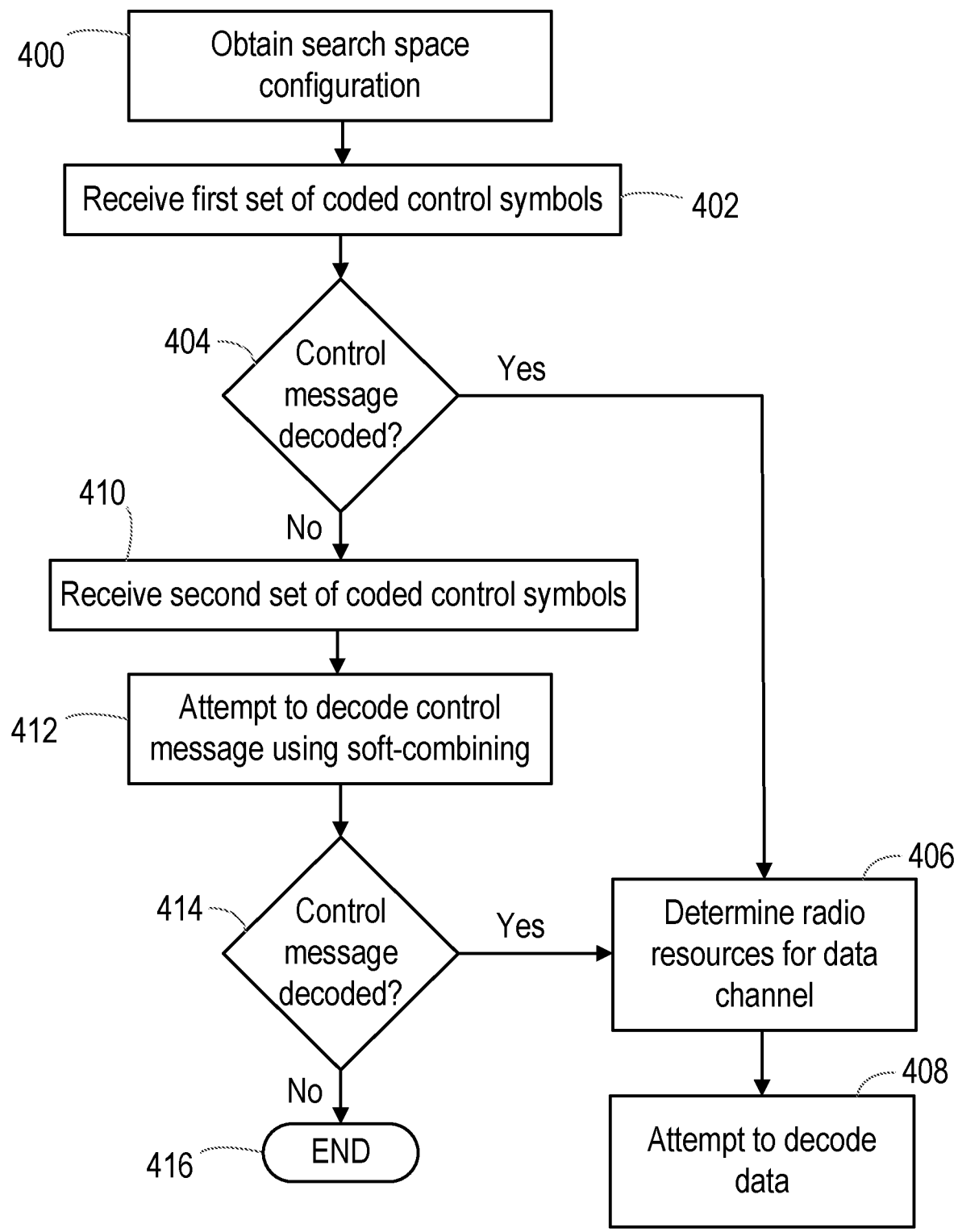
FIG. 4 is a flowchart of a method in a wireless device according to embodiments of the disclosure.

FIG. 4 is a flowchart of a method according to embodiments of the disclosure, in a wireless device operable in a wireless communications network.

The method begins in step 400, in which the wireless device obtains a search space configuration. The search space configuration comprises a plurality of search space entries, each entry defining resources (e.g. physical resource blocks, transmission frequencies, etc) at which a network node operable in the wireless communication network may transmit a physical control channel (e.g. PDCCH, ePDCCH, etc) to the wireless device. One or more of the search space entries comprises resources in a plurality of time slots, which the wireless device is to utilize for soft-combining. The search space configuration may additionally comprise one or more search space entries comprising resources in a single time slot. Thus each time slot may comprise one or more soft-combining search space entries, and one or more search space entries relating to a single time slot.

The search space configuration may be common to all wireless devices (e.g. all wireless devices served by a particular network node), or specific to the particular wireless device, or may comprise both common search space entries and device-specific search space entries. In either case, the search space configuration may be obtained in a number of different ways, such as via signalling from a network node (e.g. system information, RRC signalling, etc), defined in a standard, or determined based on a particular rule defined in a standard.

In step 402, in a first time slot, the wireless device receives a first set of coded control symbols on a physical control channel transmitted by the network node. For example, the wireless device may implement the search space configuration obtained in step 400 to search for the physical control channel using the radio resources defined in each of the search space entries. The wireless device may blindly search for the physical control channel on the radio resources defined for each of the search space entries.

The first set of coded control symbols may comprise or correspond to a control message transmitted by the network node to the wireless device via the physical control channel. For example, the control message may comprise an indication of resources which are allocated to the wireless device for the receipt of data over a physical data channel (such as the PDSCH). The indication of resources may be provided in downlink control information, for example.

In step 404, the wireless device determines if the control message can be decoded using the first set of coded control symbols. If the control message can be decoded based on the first set of coded control symbols alone, the method proceeds to step 406, in which the wireless device determines the radio resources allocated to the wireless device for receipt of data over a physical data channel (e.g. in the first time slot). The radio resources are indicated in the control message, e.g. in a decoded DCI message. In step 408, the wireless device attempts to decode a set of coded data symbols received on the indicated resources. The coded data symbols may comprise or correspond to user data (e.g. user plane) transmitted to the wireless device.

If it is determined in step 404 that a control message cannot be successfully decoded using the first set of coded control symbols alone, the method proceeds to step 410 in which the wireless device attempts to receive a second set of coded control symbols transmitted by the network node via the physical control channel in a second, subsequent time slot. For example, the second time slot may immediately follow the first time slot, such that the first and second time slots are consecutive. The second set of coded control symbols comprises or corresponds to a duplicate copy of the control message transmitted in the first set of coded control symbols.

Step 410 may be similar to step 402, in that the wireless device utilizes the search space configuration to search for the presence of a physical control channel in each of the search space entries. Again, the wireless device may blindly search for the presence of a physical control channel on the radio resources defined for each of the search space entries. Although not explicitly illustrated in FIG. 4, the wireless device may attempt to decode a control message using only the second set of coded control symbols, in a similar manner to steps 402 and 404. If successful, the method may proceed to steps 406 and 408; if unsuccessful, the method proceeds to step 412.

The method proceeds to step 412, in which the wireless device attempts to decode a control message based on the first and second sets of coded control symbols using one or more soft-combining techniques. Thus the wireless device utilizes the one or more soft-combining search space entries (i.e. defining resources in the first and second time slots) to attempt to decode the control message.

Those skilled in the art will be familiar with multiple soft-combining techniques and the present disclosure is not limited in that respect. For example, the radio energy collected in the first and second sets of coded control symbols may be combined, and a joint decoding operation performed on the combined energy. Chase combining is a similar technique that is well known in the art. Both of these techniques rely on the first and second sets of coded control symbols being transmitted with the same types of bits (e.g. the same modulation scheme) and the same parity bits. Alternatively, particularly if a different modulation scheme is used for each set of symbols or different data is combined with the duplicated data, the first and second sets of coded control symbols may be decoded separately and a soft decision taken on each set of symbols. The soft decisions can then be combined.

In some embodiments, the soft-combining is performed on a soft-combining search space entry only if a receiver transmission power threshold is surpassed, also known as DTX detection. For example, it may be determined in step 402 that the radio energy received in the resources forming part of a soft-combining search space entry in the first time slot failed to meet a threshold value. Responsive to that determination, a flag may be set to indicate that soft-combining should not be performed in respect of that soft-combining search space entry. Thus the wireless device does not waste resources in attempt to decode a control message using soft-combining when insufficient energy has been received in the first time slot for the attempt to be successful. No DTX flag means some power was received, and the search space entry is then combined.

In further embodiments, the network node may transmit a predefined sequence or chain of control messages (containing duplicate messages) on consecutive time slots over the physical control channel, using the resources defined by a soft-combining search space entry. Such sequences may have a predefined number of repetitions, or a predefined maximum number of repetitions, and be separated by a time slot in which null energy is transmitted over the resources of the soft-combining search space entry. Thus, by detecting null energy in a soft-combining search space entry for a particular time slot, the wireless device may be able to determine the start or end of a predefined sequence of transmissions, and ensure that soft-combining only takes place using transmissions which are intended to be soft-combined.

For example, consider the situation in which two wireless devices are monitoring the same soft-combining search space entry. The wireless devices may be preconfigured with the information (e.g. through signalling from the network node, such as RRC signalling or system information broadcast, etc) that each control message will be repeated four times. The network node may then transmit a sequence: 0-CCE1-CCE1-CCE1-CCE1-0-CCE2-CCE2-CCE2-CCE2-0 (where 0 indicates null energy, and where CCE1 and CCE2 indicate control channel elements for the first and second wireless device respectively). Upon detecting the null energy, each wireless device is able to determine that a transmission in the following time slot is the first time slot of a sequence; or that a transmission in the preceding time slot was the final time slot of a sequence, and utilize soft-combining to combine transmissions only from the same sequence.

In further embodiments, the length of the chain of duplicate physical control channel transmissions may be indicated implicitly by associating a particular scrambling sequence with different lengths of chain. For example, a first scrambling sequence may be used by the network node to scramble transmissions which are transmitted in a single time slot (i.e. without duplication); a second scrambling sequence may be used to scramble transmissions which are transmitted in two time slots, and so on. The initial time slot to use for the purposes of soft-combining may thus be inferred by the wireless device based on the particular scrambling sequence used to decode the transmissions.

In some circumstances, the soft-combining may further assume a quasi-colocation (QCL) relationship between the resources making up a soft-combining search space entry. For example, if the resources in the first and second time slots are the same (i.e. use the same transmission frequency), and the transmissions in the first and second time slots are from the same network node (transmission point), it may be assumed that the channel conditions over which the wireless signals are transmitted are approximately the same. Thus one or more channel parameters (such as the channel matrix, the Doppler spread, etc) may be estimated by the wireless device based on a combination of the first and second coded control symbols, and the same channel filtering applied to each set of symbols. This behaviour may be implemented in low SNR conditions, where the channel estimation is limiting performance in decoding the physical control channel.

Each entry of the search space configuration may be associated with a different QCL assumption for synchronization and channel estimation. This type of QCL assumption may be needed when different entries are associated with different transmission points or different beams from the same transmission point.

In step 414 it is determined whether the control message was successfully decoded using soft-combining. If the control message was decoded, the method proceeds to steps 406 and 408 in which the wireless device determines the resources which are allocated to it for the receipt of user data over the physical data channel, and then attempts to decode that user data.

If the control message still could not be decoded, the method proceeds to step 416 and, in the illustrated embodiment, the method ends. For example, the wireless device may assume that no control message was transmitted to it, or take some remedial action to restore or improve its connection to the network. For example, the wireless device may seek to re-establish the connection through a random access procedure.

Alternatively, the wireless device may attempt to receive a third set of coded control symbols in a third time slot, and utilize soft-combining to attempt to decode the control message based on three sets of symbols. For example, the search space configuration may comprise a soft-combining search space entry defining resources in three or more consecutive time slots. In principle, data from any number of time slots may be combined to increase the likelihood of successfully decoding the control message.

The wireless device may be configured to utilize soft-combining only for certain types of traffic, i.e., only when the network node has a certain type of traffic to transmit to the wireless device via the physical data channel. For example, soft-combining search space entries in the search space configuration may be configured or activated only for certain traffic types. In one example, the wireless device may be configured to utilize soft-combining for URLLC communications, or other traffic types or logical channels associated with particularly high quality of service (QoS) requirements. A further example may relate to the transmission of system information broadcast (SIB) messages, particularly device-specific SIB messages. The network node may configure the wireless device based on its own knowledge of the data which is to be transmitted (e.g. through signalling such as RRC signalling), or the wireless device may be aware of the traffic type and autonomously utilize soft-combining (or activate the soft-combining search space entries).

As a further alternative, the wireless device may be configured to utilize soft-combining based on a particular format of the control message (e.g. a particular DCI format). In this embodiment, when searching the search space entries in the search space configuration for this particular control message format, the wireless device may utilize soft-combining of data received in one or more adjacent time slots as described above.

Figure 5:
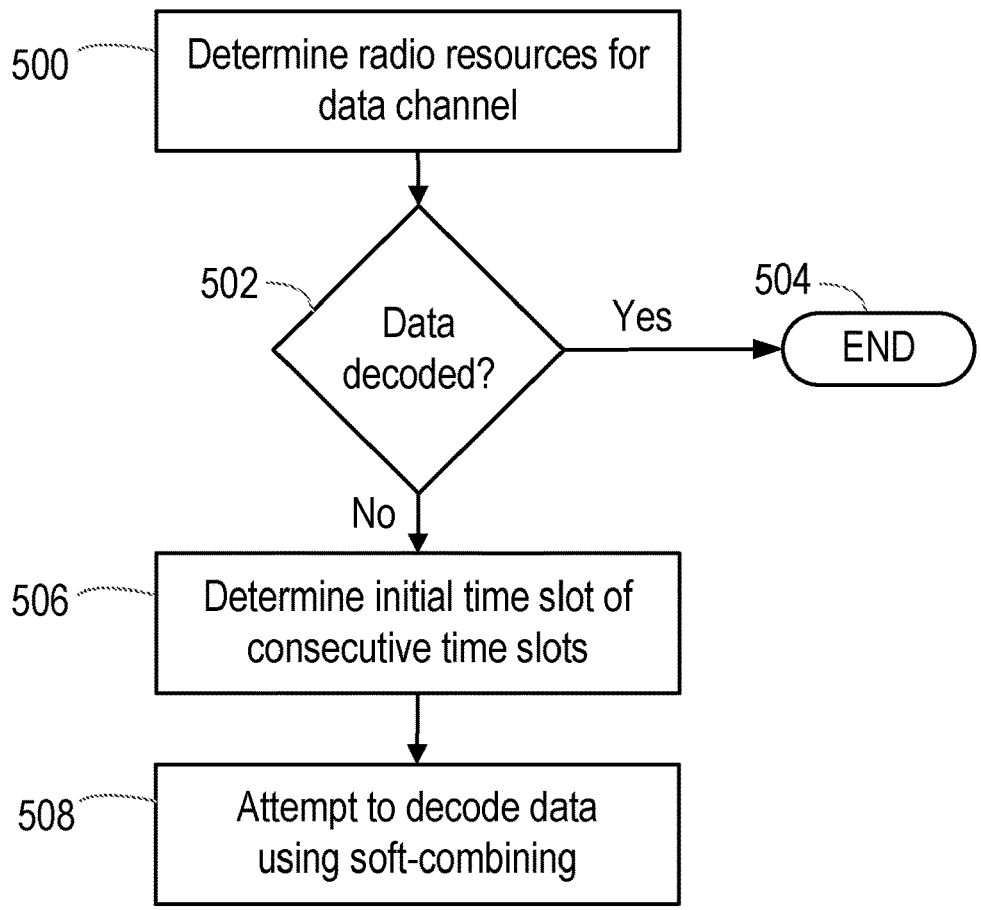
FIG. 5 is a flowchart of a method in a wireless device according to further embodiments of the disclosure.

FIG. 5 is a flowchart of a method in a wireless device according to further embodiments of the disclosure. In this embodiment, data transmissions (i.e. over a physical data channel) from one or more network nodes to the wireless device are repeated in a chain of consecutive time slots to allow those transmissions to be soft-combined.

The method begins in step 500, in which the wireless device determines the radio resources allocated to it for the receipt of user data of a physical data channel. For example, the wireless device may have decoded a control message (e.g. DCI) received over a physical control channel, comprising an indication of the radio resources. The control message may have been decoded based on a set of coded control symbols received in a single time slot, or based on multiple sets of coded control symbols received over multiple time slots. The wireless device may thus have performed the method described above with respect to FIG. 4.

In step 502, the wireless device attempts to decode the data based on a set of coded data symbols received over the resources determined in step 500. If the attempt is successful, the method ends in step 504.

If the attempt to decode the data is unsuccessful, the method proceeds to step 506 in which the wireless device determines an initial time slot of the chain of time slots. By soft-combining data from only those time slots in which the network node was transmitting, the likelihood of successfully decoding that data is increased.

The initial time slot may be determined in a number of different ways. For example, the initial time slot may be inferred based on the successful decoding of the control message comprising the indication of resources in step 500. If the control message was successfully decoded based on a set of coded control symbols received in a single time slot, the wireless device may infer that time slot as the initial time slot of the chain. If the control message was successfully decoded based on two sets of coded control symbols for the current time slot and a preceding time slot, the wireless device may infer the preceding time slot as the initial time slot of the chain, and so on. However, there can be occasions when the time slots do not match in this way. For example, if channel conditions are very good for a particular time slot, the wireless device may decode the control message based on a single set of coded control symbols in that time slot, whereas in fact multiple transmissions have previously taken place.

To overcome this problem, the wireless device may attempt to decode the control signal using all available hypotheses (e.g. all available search space entries, including those covering multiple time slots) to determine the best overall result and thus deduce the initial time slot for the physical data channel transmissions. However, this is likely to require significant computational overhead that will limit latency gains, and increase battery consumption.

One embodiment has been described above, in which the control message comprises a chain start indicator (e.g. an explicit field) comprising an indication of the initial time slot of the sequence.

In further embodiments, the chain start may be indicated implicitly. For example, the search space configuration may comprise search space entries which are associated with particular chain start time slots. Thus receipt of a control message using a particular search space entry may indicate to the wireless device that a particular time slot is the initial time slot for the corresponding data transmissions.

In yet further embodiments, the chain start may be determined by determining the time slot in which an initial transmission of the control message took place. For example, the description above sets out various embodiments where the wireless device may determine the initial time slot for the purposes of soft-combining to decode a control message. These embodiments included determining the initial time slot by inferring that null energy detected in a particular time slot indicated that the following time slot is the initial time slot; inferring the initial time slot based on a preconfigured sequence of different resources, and the detection of a transmission using one of those resources (thus implying the position within the sequence, from which the initial time slot of the sequence can be inferred); and the particular scrambling sequence used to successfully decode the control message.

In step 508, the wireless device attempts to decode the data (e.g. user data) using soft-combining, i.e. by combining multiple sets of coded data symbols received in multiple time slots. For example, the wireless device may attempt to decode the data using the set of coded data symbols received in the initial time slot determined in step 506, and one or more sets of coded data symbols received in one or more time slots following the initial time slot.

The description above has focussed on embodiments in which wireless communications take place between a wireless device and a single network node. However, those skilled in the art will appreciate that many schemes exist in which transmissions between a wireless device and the network take place with multiple network nodes. For example, a base station may utilize multiple geographically separate transmission points for transmitting to a wireless device and receiving signals from a wireless device. Alternatively or additionally, a wireless device may utilize a dual connectivity scheme in which transmissions take place simultaneously with more than one network node (base station). In the context of the present disclosure, this means that a transmission from one network node may be soft-combined with a transmission from another network node, provided those network nodes are co-ordinated to transmit duplicate copies of a control message or user data. Thus, in some embodiments the first set of coded control symbols which the wireless device attempts to receive may be transmitted by a first network node, while the second set of coded control symbols which the wireless device attempts to receive may be transmitted by a second network node.

Figure 6:
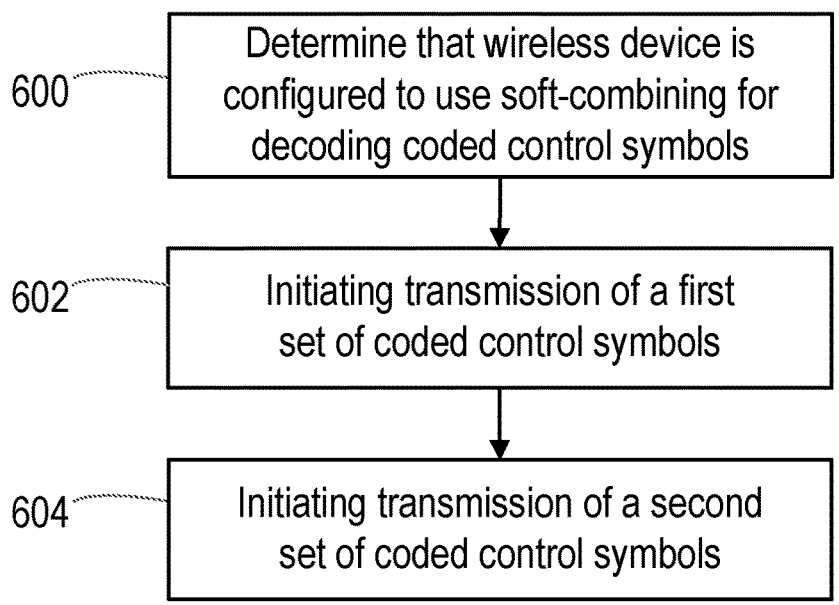
FIG. 6 is a flowchart of a method in a network node according to embodiments of the disclosure.

FIG. 6 is a flowchart of a method in a network node operable in a wireless communications network according to embodiments of the disclosure.

The method begins in step 600, in which the network node determines that a wireless device operable in the network is configured to soft-combine physical control channel transmissions received over multiple time slots. For example, the network node may itself configure the wireless device to use soft-combining (e.g. through dedicated signalling such as RRC signalling, or broadcast signalling such as system information broadcast). Alternatively, the network node may determine that the wireless device is preconfigured to utilize soft-combining for traffic of a certain type, or having certain criteria (such as high QoS requirements, etc).

In step 602, the network node initiates transmission of a first set of coded control symbols using a physical control channel to the wireless device in a first time slot. In step 604, the network node initiates transmission of a second set of coded control symbols to the wireless device using the physical control channel in a second time slot. Both sets of coded control symbols comprise or correspond to a duplicate control message. For example, the control message may comprise an indication of resources which are allocated to the wireless device for the receipt of data over a physical data channel (such as the PDSCH). The indication of resources may be provided in downlink control information, for example.

In further embodiments, data transmissions (i.e. over a physical data channel) from the network node to the wireless device may be repeated in a chain of consecutive time slots to allow those transmissions to be soft-combined. This may be in addition to, or as an alternative to, duplication of control messages on the physical control message.

Where the duplicate copies of data are transmitted on the physical data channel, the network node transmits duplicate copies of user data in multiple time slots. For example, the network node may transmit a first set of coded data symbols in the first time slot; and a second set of coded data symbols in the second time slot. The first set of coded data symbols may comprise, or correspond to, user data to be transmitted to the wireless device. The second set of coded data symbols may comprise, or correspond to, a duplicate copy of that user data. In this way, the first and second time slots form a chain of time slots with duplicate copies of data (which can be soft-combined).

The network node may further provide the wireless device with an indication of the initial time slot of the chain of time slots. For example, the control message may comprise an explicit indication of the chain start (e.g. a field in DCI).

In further embodiments, the chain start may be indicated implicitly. For example, the search space configuration may comprise search space entries which are associated with particular chain start time slots. Thus transmission of a control message using a particular search space entry may indicate to the wireless device that a particular time slot is the initial time slot for the corresponding data transmissions.

In yet further embodiments, the network node may indicate the time slot in which an initial transmission of the control message took place. For example, the network node may transmit null energy in a particular time slot, indicating that the following time slot is the initial time slot; the network node may pre-configure the wireless device with a sequence of different resources, such that the detection of a transmission using one of those resources implies the position within the sequence, from which the initial time slot of the sequence can be inferred; the network node may utilize a particular scrambling sequence to indicate the initial time slot of the chain.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 706, network nodes 760 and 760b, and WDs 710, 710b, and 710c. In practice, a wireless network may further include any additional elements suitable to support communication between wireless devices or between a wireless device and another communication device, such as a landline telephone, a service provider, or any other network node or end device. Of the illustrated components, network node 760 and wireless device (WD) 710 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 706 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 760 and WD 710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 760 includes processing circuitry 770, device readable medium 780, interface 790, auxiliary equipment 784, power source 786, power circuitry 787, and antenna 762. Although network node 760 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 760 are depicted as single boxes located within a larger box, or nested within multiple boxes, in practice, a network node may comprise multiple different physical components that make up a single illustrated component (e.g., device readable medium 780 may comprise multiple separate hard drives as well as multiple RAM modules).

Similarly, network node 760 may be composed of multiple physically separate components (e.g., a NodeB component and a RNC component, or a BTS component and a BSC component, etc.), which may each have their own respective components. In certain scenarios in which network node 760 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 760 may be configured to support multiple radio access technologies (RATs). In such embodiments, some components may be duplicated (e.g., separate device readable medium 780 for the different RATs) and some components may be reused (e.g., the same antenna 762 may be shared by the RATs). Network node 760 may also include multiple sets of the various illustrated components for different wireless technologies integrated into network node 760, such as, for example, GSM, WCDMA, LTE, NR, WiFi, or Bluetooth wireless technologies. These wireless technologies may be integrated into the same or different chip or set of chips and other components within network node 760.

Processing circuitry 770 is configured to perform any determining, calculating, or similar operations (e.g., certain obtaining operations) described herein as being provided by a network node. These operations performed by processing circuitry 770 may include processing information obtained by processing circuitry 770 by, for example, converting the obtained information into other information, comparing the obtained information or converted information to information stored in the network node, and/or performing one or more operations based on the obtained information or converted information, and as a result of said processing making a determination.

Processing circuitry 770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 760 components, such as device readable medium 780, network node 760 functionality. For example, processing circuitry 770 may execute instructions stored in device readable medium 780 or in memory within processing circuitry 770. Such functionality may include providing any of the various wireless features, functions, or benefits discussed herein. In some embodiments, processing circuitry 770 may include a system on a chip (SOC).

In some embodiments, processing circuitry 770 may include one or more of radio frequency (RF) transceiver circuitry 772 and baseband processing circuitry 774. In some embodiments, radio frequency (RF) transceiver circuitry 772 and baseband processing circuitry 774 may be on separate chips (or sets of chips), boards, or units, such as radio units and digital units. In alternative embodiments, part or all of RF transceiver circuitry 772 and baseband processing circuitry 774 may be on the same chip or set of chips, boards, or units In certain embodiments, some or all of the functionality described herein as being provided by a network node, base station, eNB or other such network device may be performed by processing circuitry 770 executing instructions stored on device readable medium 780 or memory within processing circuitry 770. In alternative embodiments, some or all of the functionality may be provided by processing circuitry 770 without executing instructions stored on a separate or discrete device readable medium, such as in a hard-wired manner. In any of those embodiments, whether executing instructions stored on a device readable storage medium or not, processing circuitry 770 can be configured to perform the described functionality. The benefits provided by such functionality are not limited to processing circuitry 770 alone or to other components of network node 760, but are enjoyed by network node 760 as a whole, and/or by end users and the wireless network generally.

Device readable medium 780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 770. Device readable medium 780 may store any suitable instructions, data or information, including a computer program, software, an application including one or more of logic, rules, code, tables, etc. and/or other instructions capable of being executed by processing circuitry 770 and, utilized by network node 760. Device readable medium 780 may be used to store any calculations made by processing circuitry 770 and/or any data received via interface 790. In some embodiments, processing circuitry 770 and device readable medium 780 may be considered to be integrated.

Interface 790 is used in the wired or wireless communication of signalling and/or data between network node 760, network 706, and/or WDs 710. As illustrated, interface 790 comprises port(s)/terminal(s) 794 to send and receive data, for example to and from network 706 over a wired connection. Interface 790 also includes radio front end circuitry 792 that may be coupled to, or in certain embodiments a part of, antenna 762. Radio front end circuitry 792 comprises filters 798 and amplifiers 796. Radio front end circuitry 792 may be connected to antenna 762 and processing circuitry 770. Radio front end circuitry may be configured to condition signals communicated between antenna 762 and processing circuitry 770. Radio front end circuitry 792 may receive digital data that is to be sent out to other network nodes or WDs via a wireless connection. Radio front end circuitry 792 may convert the digital data into a radio signal having the appropriate channel and bandwidth parameters using a combination of filters 798 and/or amplifiers 796. The radio signal may then be transmitted via antenna 762. Similarly, when receiving data, antenna 762 may collect radio signals which are then converted into digital data by radio front end circuitry 792. The digital data may be passed to processing circuitry 770. In other embodiments, the interface may comprise different components and/or different combinations of components.

In certain alternative embodiments, network node 760 may not include separate radio front end circuitry 792, instead, processing circuitry 770 may comprise radio front end circuitry and may be connected to antenna 762 without separate radio front end circuitry 792. Similarly, in some embodiments, all or some of RF transceiver circuitry 772 may be considered a part of interface 790. In still other embodiments, interface 790 may include one or more ports or terminals 794, radio front end circuitry 792, and RF transceiver circuitry 772, as part of a radio unit (not shown), and interface 790 may communicate with baseband processing circuitry 774, which is part of a digital unit (not shown).

Antenna 762 may include one or more antennas, or antenna arrays, configured to send and/or receive wireless signals. Antenna 762 may be coupled to radio front end circuitry 790 and may be any type of antenna capable of transmitting and receiving data and/or signals wirelessly. In some embodiments, antenna 762 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 762 may be separate from network node 760 and may be connectable to network node 760 through an interface or port.

Antenna 762, interface 790, and/or processing circuitry 770 may be configured to perform any receiving operations and/or certain obtaining operations described herein as being performed by a network node. Any information, data and/or signals may be received from a wireless device, another network node and/or any other network equipment. Similarly, antenna 762, interface 790, and/or processing circuitry 770 may be configured to perform any transmitting operations described herein as being performed by a network node. Any information, data and/or signals may be transmitted to a wireless device, another network node and/or any other network equipment.

Power circuitry 787 may comprise, or be coupled to, power management circuitry and is configured to supply the components of network node 760 with power for performing the functionality described herein. Power circuitry 787 may receive power from power source 786. Power source 786 and/or power circuitry 787 may be configured to provide power to the various components of network node 760 in a form suitable for the respective components (e.g., at a voltage and current level needed for each respective component). Power source 786 may either be included in, or external to, power circuitry 787 and/or network node 760. For example, network node 760 may be connectable to an external power source (e.g., an electricity outlet) via an input circuitry or interface such as an electrical cable, whereby the external power source supplies power to power circuitry 787. As a further example, power source 786 may comprise a source of power in the form of a battery or battery pack which is connected to, or integrated in, power circuitry 787. The battery may provide backup power should the external power source fail. Other types of power sources, such as photovoltaic devices, may also be used.

Alternative embodiments of network node 760 may include additional components beyond those shown in FIG. 7 that may be responsible for providing certain aspects of the network node's functionality, including any of the functionality described herein and/or any functionality necessary to support the subject matter described herein. For example, network node 760 may include user interface equipment to allow input of information into network node 760 and to allow output of information from network node 760. This may allow a user to perform diagnostic, maintenance, repair, and other administrative functions for network node 760.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 710 includes antenna 711, interface 714, processing circuitry 720, device readable medium 730, user interface equipment 732, auxiliary equipment 734, power source 736 and power circuitry 737. WD 710 may include multiple sets of one or more of the illustrated components for different wireless technologies supported by WD 710, such as, for example, GSM, WCDMA, LTE, NR, WiFi, WiMAX, or Bluetooth wireless technologies, just to mention a few. These wireless technologies may be integrated into the same or different chips or set of chips as other components within WD 710.

Antenna 711 may include one or more antennas or antenna arrays, configured to send and/or receive wireless signals, and is connected to interface 714. In certain alternative embodiments, antenna 711 may be separate from WD 710 and be connectable to WD 710 through an interface or port. Antenna 711, interface 714, and/or processing circuitry 720 may be configured to perform any receiving or transmitting operations described herein as being performed by a WD. Any information, data and/or signals may be received from a network node and/or another WD. In some embodiments, radio front end circuitry and/or antenna 711 may be considered an interface.

As illustrated, interface 714 comprises radio front end circuitry 712 and antenna 711. Radio front end circuitry 712 comprise one or more filters 718 and amplifiers 716. Radio front end circuitry 714 is connected to antenna 711 and processing circuitry 720, and is configured to condition signals communicated between antenna 711 and processing circuitry 720. Radio front end circuitry 712 may be coupled to or a part of antenna 711. In some embodiments, WD 710 may not include separate radio front end circuitry 712; rather, processing circuitry 720 may comprise radio front end circuitry and may be connected to antenna 711. Similarly, in some embodiments, some or all of RF transceiver circuitry 722 may be considered a part of interface 714. Radio front end circuitry 712 may receive digital data that is to be sent out to other network nodes or WDs via a wireless connection. Radio front end circuitry 712 may convert the digital data into a radio signal having the appropriate channel and bandwidth parameters using a combination of filters 718 and/or amplifiers 716. The radio signal may then be transmitted via antenna 711. Similarly, when receiving data, antenna 711 may collect radio signals which are then converted into digital data by radio front end circuitry 712. The digital data may be passed to processing circuitry 720. In other embodiments, the interface may comprise different components and/or different combinations of components.

Processing circuitry 720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 710 components, such as device readable medium 730, WD 710 functionality. Such functionality may include providing any of the various wireless features or benefits discussed herein. For example, processing circuitry 720 may execute instructions stored in device readable medium 730 or in memory within processing circuitry 720 to provide the functionality disclosed herein.

As illustrated, processing circuitry 720 includes one or more of RF transceiver circuitry 722, baseband processing circuitry 724, and application processing circuitry 726. In other embodiments, the processing circuitry may comprise different components and/or different combinations of components. In certain embodiments processing circuitry 720 of WD 710 may comprise a SOC. In some embodiments, RF transceiver circuitry 722, baseband processing circuitry 724, and application processing circuitry 726 may be on separate chips or sets of chips. In alternative embodiments, part or all of baseband processing circuitry 724 and application processing circuitry 726 may be combined into one chip or set of chips, and RF transceiver circuitry 722 may be on a separate chip or set of chips. In still alternative embodiments, part or all of RF transceiver circuitry 722 and baseband processing circuitry 724 may be on the same chip or set of chips, and application processing circuitry 726 may be on a separate chip or set of chips. In yet other alternative embodiments, part or all of RF transceiver circuitry 722, baseband processing circuitry 724, and application processing circuitry 726 may be combined in the same chip or set of chips. In some embodiments, RF transceiver circuitry 722 may be a part of interface 714. RF transceiver circuitry 722 may condition RF signals for processing circuitry 720.

In certain embodiments, some or all of the functionality described herein as being performed by a WD may be provided by processing circuitry 720 executing instructions stored on device readable medium 730, which in certain embodiments may be a computer-readable storage medium. In alternative embodiments, some or all of the functionality may be provided by processing circuitry 720 without executing instructions stored on a separate or discrete device readable storage medium, such as in a hard-wired manner. In any of those particular embodiments, whether executing instructions stored on a device readable storage medium or not, processing circuitry 720 can be configured to perform the described functionality. The benefits provided by such functionality are not limited to processing circuitry 720 alone or to other components of WD 710, but are enjoyed by WD 710 as a whole, and/or by end users and the wireless network generally.

Processing circuitry 720 may be configured to perform any determining, calculating, or similar operations (e.g., certain obtaining operations) described herein as being performed by a WD. These operations, as performed by processing circuitry 720, may include processing information obtained by processing circuitry 720 by, for example, converting the obtained information into other information, comparing the obtained information or converted information to information stored by WD 710, and/or performing one or more operations based on the obtained information or converted information, and as a result of said processing making a determination.

Device readable medium 730 may be operable to store a computer program, software, an application including one or more of logic, rules, code, tables, etc. and/or other instructions capable of being executed by processing circuitry 720. Device readable medium 730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 720. In some embodiments, processing circuitry 720 and device readable medium 730 may be considered to be integrated.

User interface equipment 732 may provide components that allow for a human user to interact with WD 710. Such interaction may be of many forms, such as visual, audial, tactile, etc. User interface equipment 732 may be operable to produce output to the user and to allow the user to provide input to WD 710. The type of interaction may vary depending on the type of user interface equipment 732 installed in WD 710. For example, if WD 710 is a smart phone, the interaction may be via a touch screen; if WD 710 is a smart meter, the interaction may be through a screen that provides usage (e.g., the number of gallons used) or a speaker that provides an audible alert (e.g., if smoke is detected). User interface equipment 732 may include input interfaces, devices and circuits, and output interfaces, devices and circuits. User interface equipment 732 is configured to allow input of information into WD 710, and is connected to processing circuitry 720 to allow processing circuitry 720 to process the input information. User interface equipment 732 may include, for example, a microphone, a proximity or other sensor, keys/buttons, a touch display, one or more cameras, a USB port, or other input circuitry. User interface equipment 732 is also configured to allow output of information from WD 710, and to allow processing circuitry 720 to output information from WD 710. User interface equipment 732 may include, for example, a speaker, a display, vibrating circuitry, a USB port, a headphone interface, or other output circuitry. Using one or more input and output interfaces, devices, and circuits, of user interface equipment 732, WD 710 may communicate with end users and/or the wireless network, and allow them to benefit from the functionality described herein.

Auxiliary equipment 734 is operable to provide more specific functionality which may not be generally performed by WDs. This may comprise specialized sensors for doing measurements for various purposes, interfaces for additional types of communication such as wired communications etc. The inclusion and type of components of auxiliary equipment 734 may vary depending on the embodiment and/or scenario.

Power source 736 may, in some embodiments, be in the form of a battery or battery pack. Other types of power sources, such as an external power source (e.g., an electricity outlet), photovoltaic devices or power cells, may also be used. WD 710 may further comprise power circuitry 737 for delivering power from power source 736 to the various parts of WD 710 which need power from power source 736 to carry out any functionality described or indicated herein. Power circuitry 737 may in certain embodiments comprise power management circuitry. Power circuitry 737 may additionally or alternatively be operable to receive power from an external power source; in which case WD 710 may be connectable to the external power source (such as an electricity outlet) via input circuitry or an interface such as an electrical power cable. Power circuitry 737 may also in certain embodiments be operable to deliver power from an external power source to power source 736. This may be, for example, for the charging of power source 736. Power circuitry 737 may perform any formatting, converting, or other modification to the power from power source 736 to make the power suitable for the respective components of WD 710 to which power is supplied.

Figure 8:
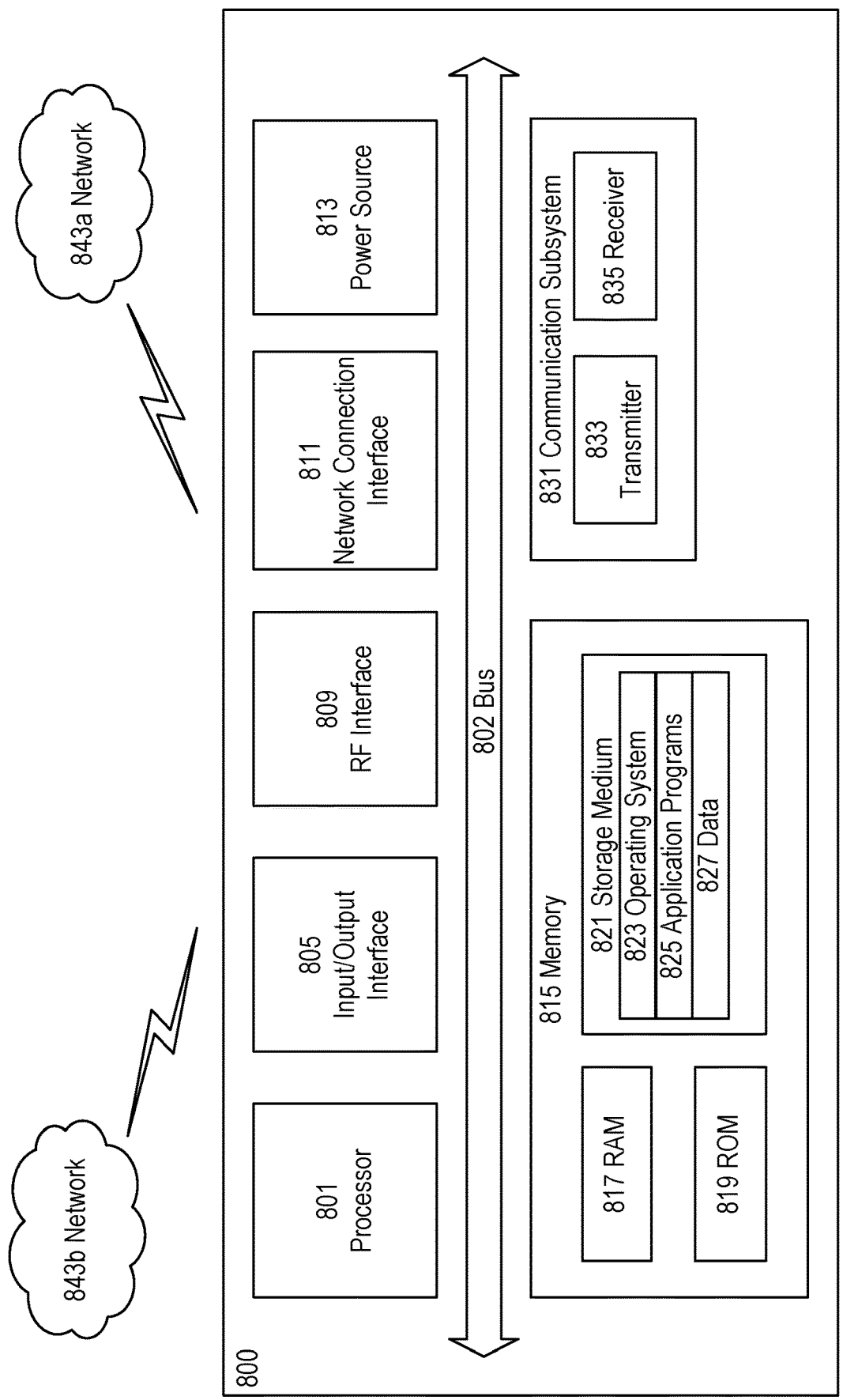
FIG. 8 shows a user equipment (UE) according to embodiments of the disclosure.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 8200 may be any UE identified by the $3^{rd}$ Generation Partnership Project (3GPP), including a NB-IoT UE, a machine type communication (MTC) UE, and/or an enhanced MTC (eMTC) UE. UE 800, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 800 includes processing circuitry 801 that is operatively coupled to input/output interface 805, radio frequency (RF) interface 809, network connection interface 811, memory 815 including random access memory (RAM) 817, read-only memory (ROM) 819, and storage medium 821 or the like, communication subsystem 831, power source 833, and/or any other component, or any combination thereof. Storage medium 821 includes operating system 823, application program 825, and data 827. In other embodiments, storage medium 821 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 801 may be configured to process computer instructions and data. Processing circuitry 801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 801 may include two central processing units (CPUs). Data may be information in a form suitable for use by a computer.

In the depicted embodiment, input/output interface 805 may be configured to provide a communication interface to an input device, output device, or input and output device. UE 800 may be configured to use an output device via input/output interface 805. An output device may use the same type of interface port as an input device. For example, a USB port may be used to provide input to and output from UE 800. The output device may be a speaker, a sound card, a video card, a display, a monitor, a printer, an actuator, an emitter, a smartcard, another output device, or any combination thereof. UE 800 may be configured to use an input device via input/output interface 805 to allow a user to capture information into UE 800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 809 may be configured to provide a communication interface to RF components such as a transmitter, a receiver, and an antenna. Network connection interface 811 may be configured to provide a communication interface to network 843a. Network 843a may encompass wired and/or wireless networks such as a local-area network (LAN), a wide-area network (WAN), a computer network, a wireless network, a telecommunications network, another like network or any combination thereof. For example, network 843a may comprise a Wi-Fi network. Network connection interface 811 may be configured to include a receiver and a transmitter interface used to communicate with one or more other devices over a communication network according to one or more communication protocols, such as Ethernet, TCP/IP, SONET, ATM, or the like. Network connection interface 811 may implement receiver and transmitter functionality appropriate to the communication network links (e.g., optical, electrical, and the like). The transmitter and receiver functions may share circuit components, software or firmware, or alternatively may be implemented separately.

RAM 817 may be configured to interface via bus 802 to processing circuitry 801 to provide storage or caching of data or computer instructions during the execution of software programs such as the operating system, application programs, and device drivers. ROM 819 may be configured to provide computer instructions or data to processing circuitry 801. For example, ROM 819 may be configured to store invariant low-level system code or data for basic system functions such as basic input and output (I/O), startup, or reception of keystrokes from a keyboard that are stored in a non-volatile memory. Storage medium 821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 821 may be configured to include operating system 823, application program 825 such as a web browser application, a widget or gadget engine or another application, and data file 827. Storage medium 821 may store, for use by UE 800, any of a variety of various operating systems or combinations of operating systems.

Storage medium 821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 821 may allow UE 800 to access computer-executable instructions, application programs or the like, stored on transitory or non-transitory memory media, to off-load data, or to upload data. An article of manufacture, such as one utilizing a communication system may be tangibly embodied in storage medium 821, which may comprise a device readable medium.

In FIG. 8, processing circuitry 801 may be configured to communicate with network 843b using communication subsystem 831. Network 843a and network 843b may be the same network or networks or different network or networks. Communication subsystem 831 may be configured to include one or more transceivers used to communicate with network 843b. For example, communication subsystem 831 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 833 and/or receiver 835 to implement transmitter or receiver functionality, respectively, appropriate to the RAN links (e.g., frequency allocations and the like). Further, transmitter 833 and receiver 835 of each transceiver may share circuit components, software or firmware, or alternatively may be implemented separately.

In the illustrated embodiment, the communication functions of communication subsystem 831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 831 may include cellular communication, Wi-Fi communication, Bluetooth communication, and GPS communication. Network 843b may encompass wired and/or wireless networks such as a local-area network (LAN), a wide-area network (WAN), a computer network, a wireless network, a telecommunications network, another like network or any combination thereof. For example, network 843b may be a cellular network, a Wi-Fi network, and/or a near-field network. Power source 813 may be configured to provide alternating current (AC) or direct current (DC) power to components of UE 800.

The features, benefits and/or functions described herein may be implemented in one of the components of UE 800 or partitioned across multiple components of UE 800. Further, the features, benefits, and/or functions described herein may be implemented in any combination of hardware, software or firmware. In one example, communication subsystem 831 may be configured to include any of the components described herein. Further, processing circuitry 801 may be configured to communicate with any of such components over bus 802. In another example, any of such components may be represented by program instructions stored in memory that when executed by processing circuitry 801 perform the corresponding functions described herein. In another example, the functionality of any of such components may be partitioned between processing circuitry 801 and communication subsystem 831. In another example, the non-computationally intensive functions of any of such components may be implemented in software or firmware and the computationally intensive functions may be implemented in hardware.

Figure 9:
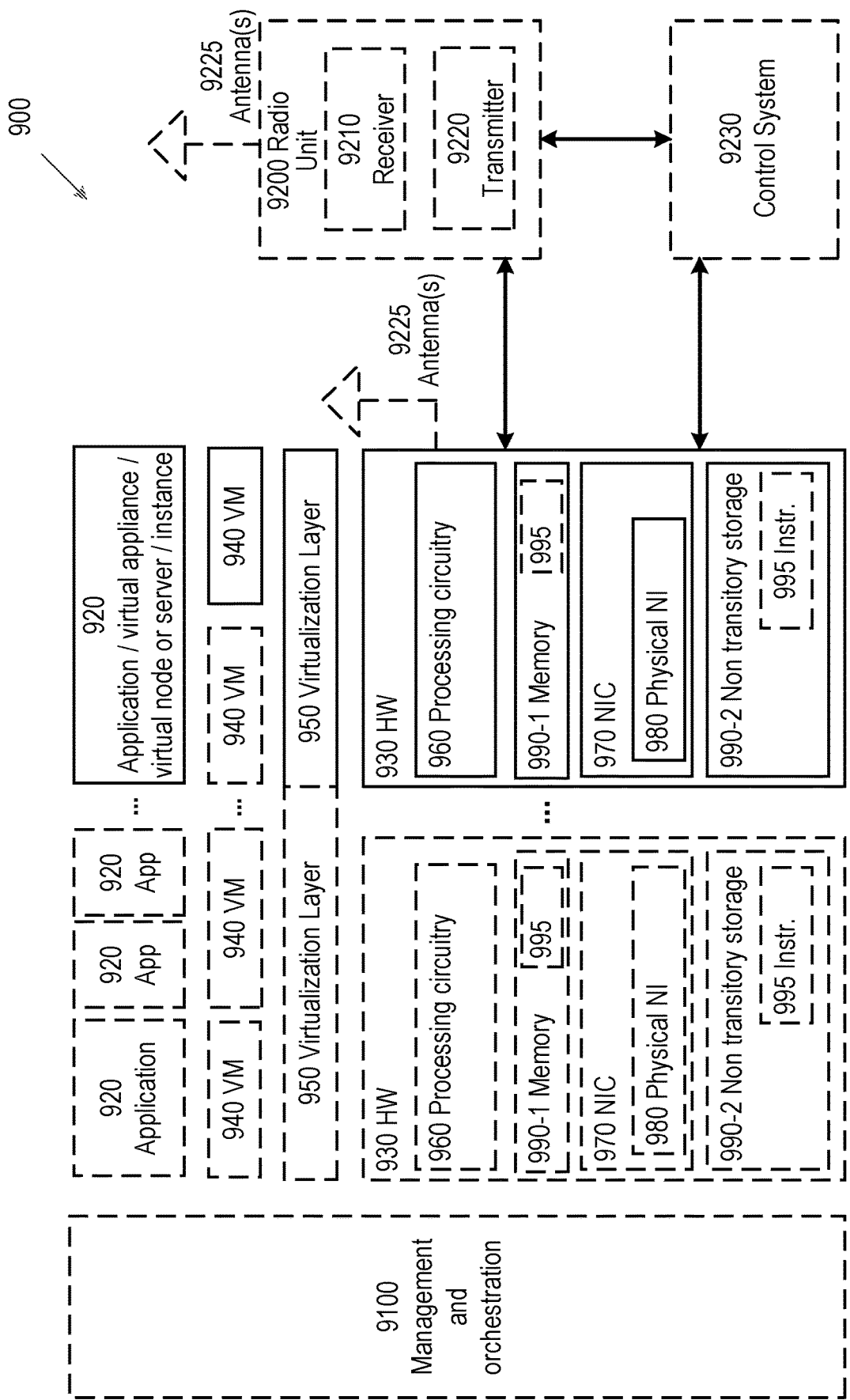
FIG. 9 shows a virtualization environment according to embodiments of the disclosure.

FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. Applications 920 are run in virtualization environment 900 which provides hardware 930 comprising processing circuitry 960 and memory 990. Memory 990 contains instructions 995 executable by processing circuitry 960 whereby application 920 is operative to provide one or more of the features, benefits, and/or functions disclosed herein.

Virtualization environment 900, comprises general-purpose or special-purpose network hardware devices 930 comprising a set of one or more processors or processing circuitry 960, which may be commercial off-the-shelf (COTS) processors, dedicated Application Specific Integrated Circuits (ASICs), or any other type of processing circuitry including digital or analog hardware components or special purpose processors. Each hardware device may comprise memory 990-1 which may be non-persistent memory for temporarily storing instructions 995 or software executed by processing circuitry 960. Each hardware device may comprise one or more network interface controllers (NICs) 970, also known as network interface cards, which include physical network interface 980. Each hardware device may also include non-transitory, persistent, machine-readable storage media 990-2 having stored therein software 995 and/or instructions executable by processing circuitry 960. Software 995 may include any type of software including software for instantiating one or more virtualization layers 950 (also referred to as hypervisors), software to execute virtual machines 940 as well as software allowing it to execute functions, features and/or benefits described in relation with some embodiments described herein.

Virtual machines 940, comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940, and the implementations may be made in different ways.

During operation, processing circuitry 960 executes software 995 to instantiate the hypervisor or virtualization layer 950, which may sometimes be referred to as a virtual machine monitor (VMM). Virtualization layer 950 may present a virtual operating platform that appears like networking hardware to virtual machine 940.

As shown in FIG. 9, hardware 930 may be a standalone network node with generic or specific components. Hardware 930 may comprise antenna 9225 and may implement some functions via virtualization. Alternatively, hardware 930 may be part of a larger cluster of hardware (e.g. such as in a data center or customer premise equipment (CPE)) where many hardware nodes work together and are managed via management and orchestration (MANO) 9100, which, among others, oversees lifecycle management of applications 920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 940 may be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network elements (VNE).

Still in the context of NFV, Virtual Network Function (VNF) is responsible for handling specific network functions that run in one or more virtual machines 940 on top of hardware networking infrastructure 930 and corresponds to application 920 in FIG. 9.

In some embodiments, one or more radio units 9200 that each include one or more transmitters 9220 and one or more receivers 9210 may be coupled to one or more antennas 9225. Radio units 9200 may communicate directly with hardware nodes 930 via one or more appropriate network interfaces and may be used in combination with the virtual components to provide a virtual node with radio capabilities, such as a radio access node or a base station.

In some embodiments, some signalling can be effected with the use of control system 9230 which may alternatively be used for communication between the hardware nodes 930 and radio units 9200.

Figure 10:
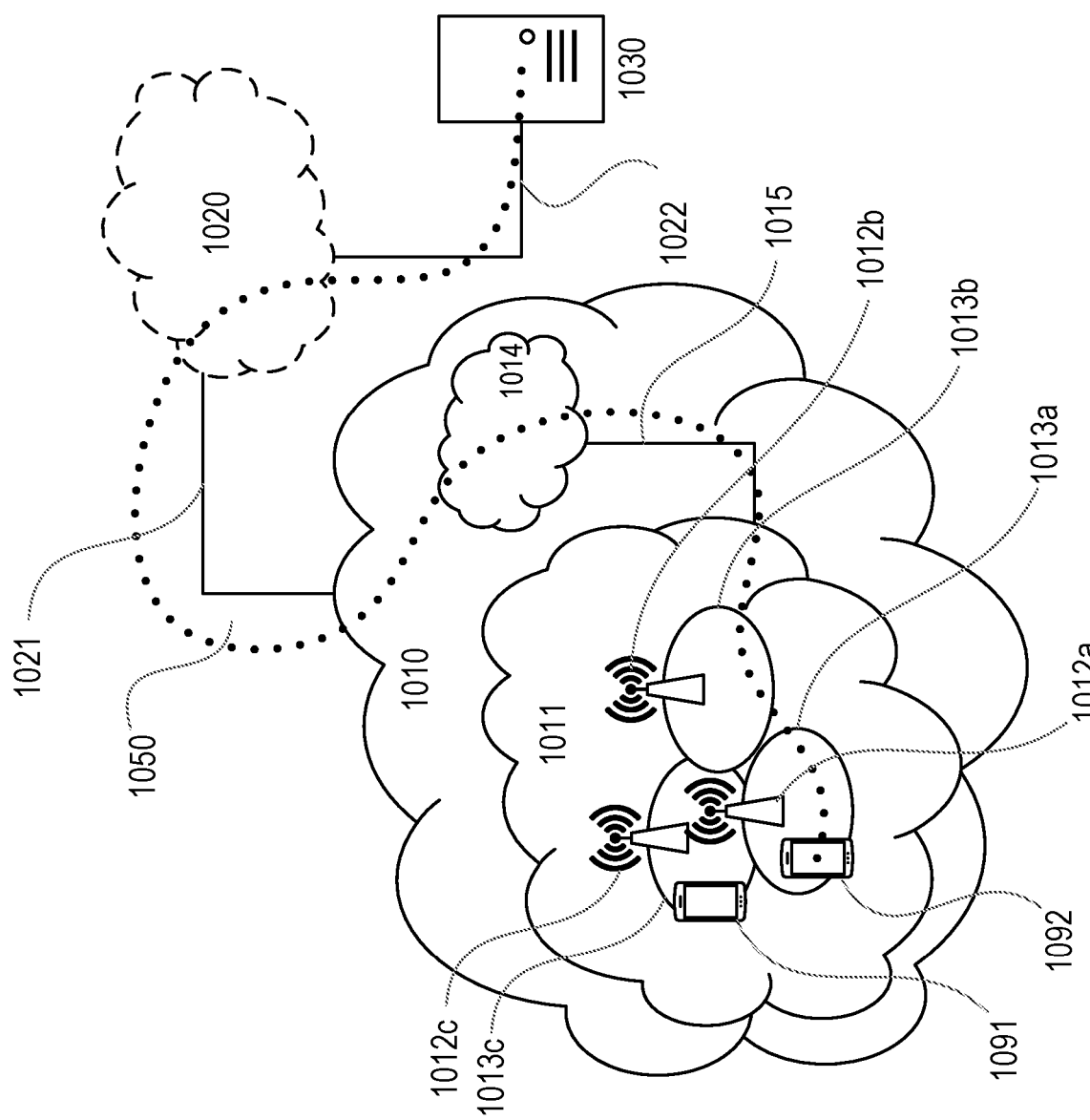
FIG. 10 shows a telecommunication network connected via an intermediate network to a host computer according to embodiments of the disclosure.

With reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A first UE 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 11. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

Figure 11:
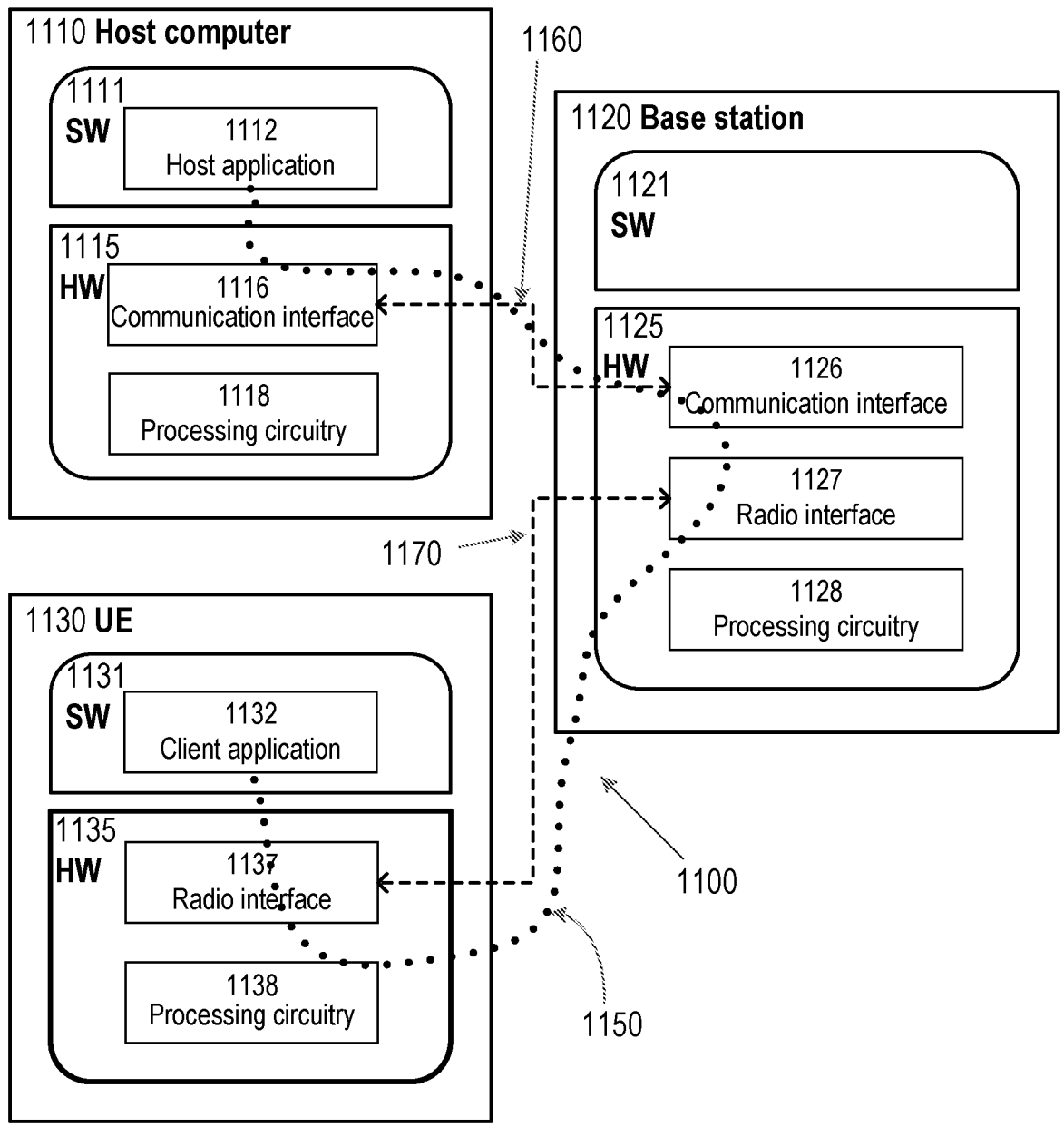
FIG. 11 shows a host computer communicating via a base station with a user equipment over a partially wireless connection according to embodiments of the disclosure.

It is noted that host computer 1110, base station 1120 and UE 1130 illustrated in FIG. 11 may be similar or identical to host computer 1030, one of base stations 1012a, 1012b, 1012c and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve the latency and reliability of downlink communications and thereby provide benefits such as reduced waiting time, higher data rates, etc.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

Figure 12:
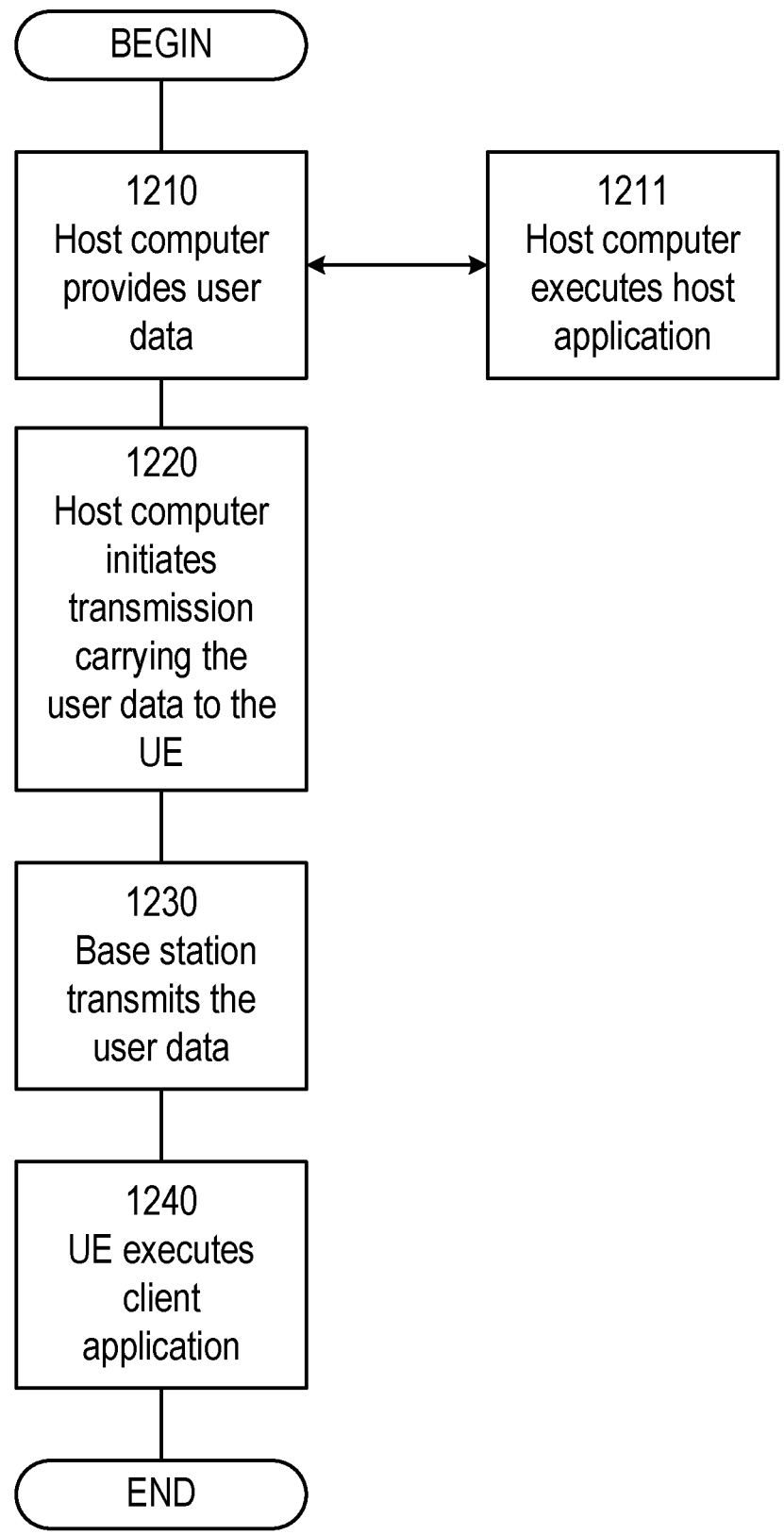
FIG. 12 is a flowchart of a method implemented in a communication system comprising a host computer, a base station and a user equipment according to embodiments of the disclosure.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

Figure 13:
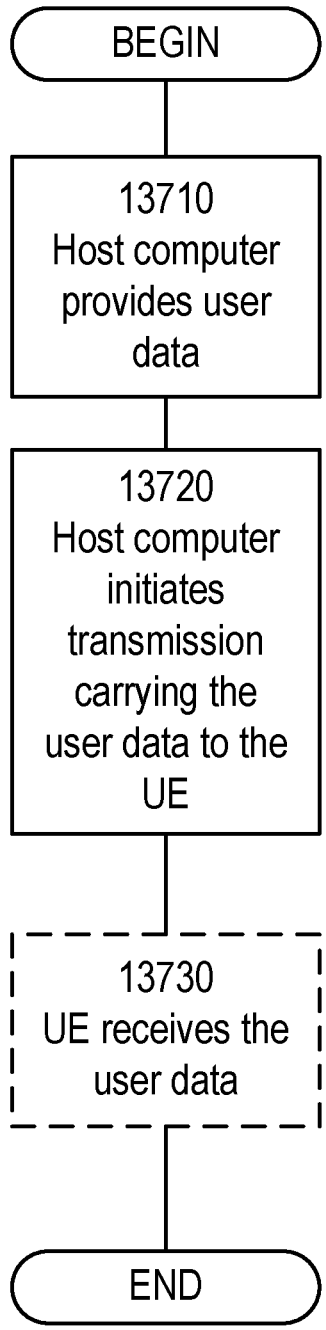
FIG. 13 is a flowchart of a method implemented in a communication system comprising a host computer, a base station and a user equipment according to further embodiments of the disclosure.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figure 14:
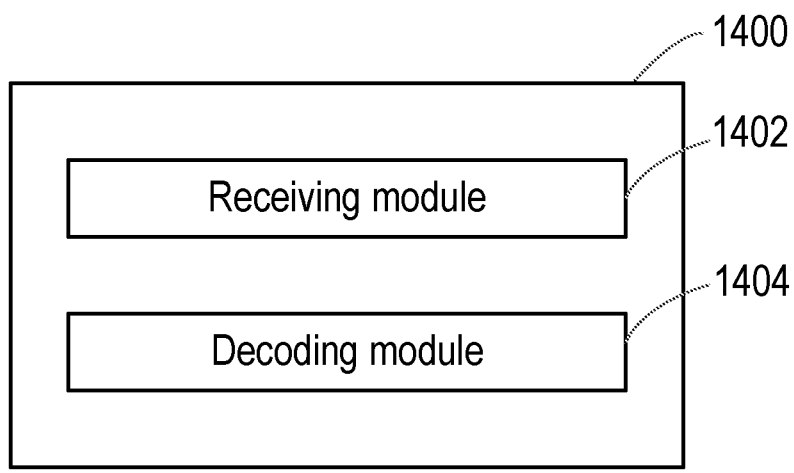
FIG. 14 is a schematic illustration of a virtual apparatus according to embodiments of the disclosure.

FIG. 14 illustrates a schematic block diagram of an apparatus 1400 in a wireless network (for example, the wireless network shown in FIG. 7). The apparatus may be implemented in a wireless device (e.g., wireless device 710 shown in FIG. 7). Apparatus 1400 is operable to carry out the example methods described with reference to FIGS. 4 and 5 and possibly any other processes or methods disclosed herein. It is also to be understood that the methods of FIGS. 4 and 5 are not necessarily carried out solely by apparatus 1400. At least some operations of the method can be performed by one or more other entities.

Virtual Apparatus 1400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit (or module) 1402 and decoding unit (or module) 1404, and any other suitable units of apparatus 1400, to perform corresponding functions according to one or more embodiments of the present disclosure.

As illustrated in FIG. 14, apparatus 1400 includes receiving unit (or module) 1402 and decoding unit (or module) 1404. The receiving unit (or module) 1402 is configured to attempt to receive a first set of coded control symbols on a physical control channel in a first time slot, and to attempt to receive a second set of coded control symbols on the physical control channel in a second time slot subsequent to the first time slot. Decoding unit (or module) 1404 is configured to attempt to decode a control message based on the first set of coded control symbols and the second set of coded control symbols using one or more soft-combining techniques.

Figure 15:
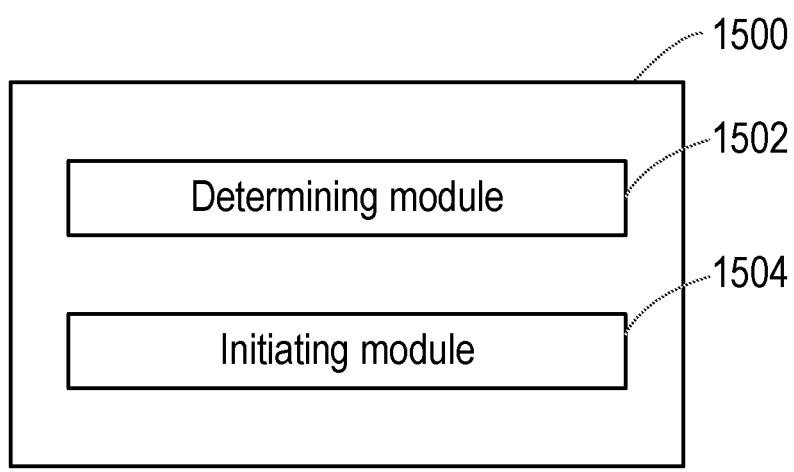
FIG. 15 is a schematic illustration of a virtual apparatus according to further embodiments of the disclosure.

FIG. 15 illustrates a schematic block diagram of an apparatus 1500 in a wireless network (for example, the wireless network shown in FIG. 7). The apparatus may be implemented in a network node (e.g., network node 760 shown in FIG. 7). Apparatus 1500 is operable to carry out the example method described with reference to FIG. 6 and possibly any other processes or methods disclosed herein. It is also to be understood that the method of FIG. 6 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining unit (or module) 1502 and initiating unit (or module) 1504, and any other suitable units of apparatus 1500, to perform corresponding functions according to one or more embodiments of the present disclosure.

As illustrated in FIG. 15, apparatus 1500 includes determining unit (or module) 1502 and initiating unit (or module) 1504. The determining unit (or module) 1502 is configured to determine that a wireless device operable in the wireless communications network is configured to soft-combine a physical control channel transmitted over multiple time slots. The initiating unit (or module) 1504 is configured to initiate transmission of a first set of coded control symbols in a physical control channel to the wireless device in a first time slot; and initiate transmission of a second set of coded control symbols in the physical control channel to the wireless device in a second time slot subsequent to the first time slot. The first set of coded control symbols comprises a control message, and the second set of coded control symbols comprises a duplicate copy of the control message.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method in a wireless device for a wireless communications network, the method comprising:
receiving a first set of coded control symbols on a physical control channel in a first time slot;
receiving a second set of coded control symbols on the physical control channel in a second time slot subsequent to the first time slot;
attempting to decode a control message based on the first set of coded control symbols and the second set of coded control symbols using one or more soft-combining techniques; and
obtaining a search space configuration, the search space configuration comprising a plurality of search space entries, each search space entry defining radio resources on which the wireless device is to search for the physical control channel, the plurality of search space entries comprising a first search space entry defining resources comprising one or more first frequency locations in the first time slot and one or more second frequency locations in the second time slot to be soft-combined.

2. The method according to claim 1, further comprising:
attempting to decode the control message responsive to a determination that radio energy received over the one or more first frequency locations in the first time slot is above a threshold.

3. The method according to claim 1, wherein the physical control channel is transmitted by a transmission point operable in the wireless communications network, wherein the one or more first frequency locations are the same as the one or more second frequency locations, and wherein the step of attempting to decode the control message comprises determining a single combined channel estimate for the first and second frequency locations.

4. The method according to claim 1, further comprising:
attempting to decode the control message based on the first set of coded control symbols; and
attempting to decode the control message based on the first set of coded control symbols and the second set of coded control symbols using the one or more soft-combining techniques responsive to a failure to decode the control message based on the first set of coded control symbols.

5. The method according to claim 1, wherein the control message comprises an indication of radio resources allocated to the wireless device for the receipt of a physical data channel, and wherein duplicate copies of user data are transmitted on the physical data channel to the wireless device in each of a plurality of consecutive time slots.

6. The method according to claim 5, wherein the control message comprises an indication of an initial time slot of the plurality of consecutive time slots.

7. The method according to claim 5, further comprising:
responsive to successful decoding of the control message based on the first set of coded control symbols and the second set of coded control symbols, determining an initial time slot of the plurality of consecutive time slots as the first time slot.

8. The method according to claim 5, further comprising:
responsive to a determination that radio energy received over radio resources allocated to the wireless device for the receipt of the physical data channel in a particular time slot is below a threshold, determining an initial time slot of the plurality of consecutive time slots as a time slot immediately following the particular time slot.

9. The method according to claim 5, further comprising:
attempting to decode the user data based on sets of coded data symbols received in the plurality of consecutive time slots on the physical data channel utilizing one or more soft-combining techniques.

10. A method in a network node for a wireless communications network, the method comprising:
- determining that a wireless device operable in the wireless communications network is configured to soft-combine a physical control channel transmitted over multiple time slots;
- initiating transmission of a first set of coded control symbols in a physical control channel to the wireless device in a first time slot;
- initiating transmission of a second set of coded control symbols in the physical control channel to the wireless device in a second time slot subsequent to the first time slot, the first set of coded control symbols comprising a control message, and the second set of coded control symbols comprises a duplicate copy of the control message; and
- the determining that a wireless device operable in the wireless communications network is configured to soft-combine a physical control channel transmitted over multiple time slots comprising determining that the wireless device is configured with a search space configuration, the search space configuration comprising a plurality of search space entries, each search space entry defining radio resources on which the wireless device is to search for the physical control channel, the plurality of search space entries comprising a first search space entry defining resources comprising one or more first frequency locations in the first time slot and one or more second frequency locations in the second time slot to be soft-combined.

11. The method according to claim 10, wherein the control message comprises an indication of radio resources allocated to the wireless device for the receipt of a physical data channel, and wherein duplicate copies of user data are transmitted on the physical data channel to the wireless device in each of a plurality of consecutive time slots.

12. The method according to claim 11, wherein the control message comprises an indication of an initial time slot of the plurality of consecutive time slots.

13. The method according to claim 11, further comprising:
- initiating transmission of null energy in the radio resources allocated to the wireless device for the receipt of the physical data channel in a time slot preceding an initial time slot of the plurality of consecutive time slots.

14. The method according to claim 10, further comprising:
- configuring the wireless device to soft-combine the first and second sets of coded control symbols based on a category of traffic to be transmitted to the wireless device.

15. The method according to claim 14, further comprising:
- configuring the wireless device to soft-combine the first and second sets of coded control symbols based on the category of traffic being one of:
- ultra-reliable low-latency communication;
- system information; and traffic
- associated with a quality of service exceeding a threshold.

16. A wireless device for a wireless communications network, the wireless device comprising processing circuitry and a non-transitory machine-readable medium storing instructions which, when executed by the processing circuitry, cause the wireless device to:
- receive a first set of coded control symbols on a physical control channel in a first time slot;
- receive a second set of coded control symbols on the physical control channel in a second time slot subsequent to the first time slot;
- attempt to decode a control message based on the first set of coded control symbols and the second set of coded control symbols using one or more soft-combining techniques; and
- obtain a search space configuration, the search space configuration comprising a plurality of search space entries, each search space entry defining radio resources on which the wireless device is to search for the physical control channel, the plurality of search space entries comprising a first search space entry defining resources comprising one or more first frequency locations in the first time slot and one or more second frequency locations in the second time slot to be soft-combined.

17. The wireless device according to claim 16, wherein the non-transitory machine-readable medium further stores instructions which, when executed by the processing circuitry, cause the wireless device to:
- attempt to decode the control message responsive to a determination that radio energy received over the one or more first frequency locations in the first time slot is above a threshold.

18. The wireless device according to claim 16, wherein the physical control channel is transmitted by a transmission point operable in the wireless communications network, wherein the one or more first frequency locations are the same as the one or more second frequency locations, and wherein the step of attempting to decode the control message comprises determining a single combined channel estimate for the first and second frequency locations.

19. The wireless device according to claim 16, wherein the non-transitory machine-readable medium further stores instructions which, when executed by the processing circuitry, cause the wireless device to:
- attempt to decode the control message based on the first set of coded control symbols; and
- attempt to decode the control message based on the first set of coded control symbols and the second set of coded control symbols using the one or more soft-combining techniques responsive to a failure to decode the control message based on the first set of coded control symbols.

20. The wireless device according to claim 16, wherein the control message comprises an indication of radio resources allocated to the wireless device for the receipt of a physical data channel, and wherein duplicate copies of user data are transmitted on the physical data channel to the wireless device in each of a plurality of consecutive time slots.

21. The wireless device according to claim 20, wherein the control message comprises an indication of an initial time slot of the plurality of consecutive time slots.

22. The wireless device according to claim 20, wherein the non-transitory machine-readable medium further stores instructions which, when executed by the processing circuitry, cause the wireless device to:
- responsive to successful decoding of the control message based on the first set of coded control symbols and the second set of coded control symbols, determine an initial time slot of the plurality of consecutive time slots as the first time slot.

23. The wireless device according to claim 20, wherein the non-transitory machine-readable medium further stores instructions which, when executed by the processing circuitry, cause the wireless device to:

responsive to a determination that radio energy received over radio resources allocated to the wireless device for the receipt of the physical data channel in a particular time slot is below a threshold, determine an initial time slot of the plurality of consecutive time slots as a time slot immediately following the particular time slot.

24. The wireless device according to claim 20, wherein the non-transitory machine-readable medium further stores instructions which, when executed by the processing circuitry, cause the wireless device to:

attempt to decode the user data based on sets of coded data symbols received in the plurality of consecutive time slots on the physical data channel utilizing one or more soft-combining techniques.

25. A network node for a wireless communications network, the network node comprising processing circuitry and a non-transitory machine-readable medium storing instructions which, when executed by the processing circuitry, cause the network node to:

determine that a wireless device operable in the wireless communications network is configured to soft-combine a physical control channel transmitted over multiple time slots;

initiate transmission of a first set of coded control symbols in a physical control channel to the wireless device in a first time slot;

initiate transmission of a second set of coded control symbols in the physical control channel to the wireless device in a second time slot subsequent to the first time slot, the first set of coded control symbols comprising a control message, and the second set of coded control symbols comprising a duplicate copy of the control message; and the network node caused to determine that the wireless device is configured to soft-combine the physical control channel by:

determining that the wireless device is configured with a search space configuration, the search space configuration comprising a plurality of search space entries, each search space entry defining radio resources on which the wireless device is to search for the physical control channel, the plurality of search space entries comprising a first search space entry defining resources comprising one or more first frequency locations in the first time slot and one or more second frequency locations in the second time slot to be soft-combined.

26. The network node according to claim 25, wherein the control message comprises an indication of radio resources allocated to the wireless device for the receipt of a physical data channel, and wherein duplicate copies of user data are transmitted on the physical data channel to the wireless device in each of a plurality of consecutive time slots.

27. The network node according to claim 26, wherein the control message comprises an indication of an initial time slot of the plurality of consecutive time slots.

28. The network node according to claim 26, wherein the non-transitory machine-readable medium further stores instructions which, when executed by the processing circuitry, cause the network node to:

initiate transmission of null energy in the radio resources allocated to the wireless device for the receipt of the physical data channel in a time slot preceding an initial time slot of the plurality of consecutive time slots.

29. The network node according to claim 25, wherein the non-transitory machine-readable medium further stores instructions which, when executed by the processing circuitry, cause the network node to:

configure the wireless device to soft-combine the first and second sets of coded control symbols based on a category of traffic to be transmitted to the wireless device.

30. The network node according to claim 29, wherein the non-transitory machine-readable medium further stores instructions which, when executed by the processing circuitry, cause the network node to:

configure the wireless device to soft-combine the first and second sets of coded control symbols based on the category of traffic being one of:
ultra-reliable low-latency communication;
system information; and
traffic associated with a quality of service exceeding a threshold.

* * * * *